(12) United States Patent
Maeda et al.

(10) Patent No.: US 9,019,377 B2
(45) Date of Patent: Apr. 28, 2015

(54) DRIVE RECORDER, DRIVE RECORDER SYSTEM, VEHICLE-MOUNTED VIDEO RECORDING APPARATUS, AND VEHICLE-MOUNTED VIDEO RECORDING METHOD

(75) Inventors: Munenori Maeda, Kobe (JP); Fujio Tonokawa, Kobe (JP); Katsutoshi Okada, Kobe (JP); Takashi Sasa, Kochi (JP)

(73) Assignee: Fujitsu Ten Limited, Kobe-shi (JP)

( * ) Notice: Subject to any disclaimer, the term of this patent is extended or adjusted under 35 U.S.C. 154(b) by 1514 days.

(21) Appl. No.: 12/448,186

(22) PCT Filed: Jan. 15, 2008

(86) PCT No.: PCT/JP2008/050669
§ 371 (c)(1),
(2), (4) Date: Jun. 9, 2009

(87) PCT Pub. No.: WO2008/099639
PCT Pub. Date: Aug. 21, 2008

(65) Prior Publication Data
US 2009/0278933 A1  Nov. 12, 2009

(30) Foreign Application Priority Data

Feb. 13, 2007 (JP) .................. 2007-032252
Mar. 20, 2007 (JP) .................. 2007-072314
Mar. 30, 2007 (JP) .................. 2007-093986

(51) Int. Cl.
*H04N 9/47* (2006.01)
*G07C 5/08* (2006.01)
(Continued)

(52) U.S. Cl.
CPC ............ *G07C 5/0891* (2013.01); *G07C 5/0866* (2013.01); *H04N 5/765* (2013.01); *H04N 5/77* (2013.01); *H04N 5/907* (2013.01); *H04N 7/18* (2013.01); *H04N 9/8042* (2013.01)

(58) Field of Classification Search
USPC ......... 348/65, 148, 211.14, 333.01, 362, 558, 348/563, 638, 744; 340/468, 815.45; 356/218; 353/31
See application file for complete search history.

(56) References Cited

U.S. PATENT DOCUMENTS 5,303,061 A * 4/1994 Matsumoto et al. .......... 386/204
5,920,342 A * 7/1999 Umeda et al. ............ 348/211.14
(Continued)

FOREIGN PATENT DOCUMENTS

JP     63-016785     1/1888
JP     S63-16785     1/1988
(Continued)

OTHER PUBLICATIONS

PIXIM, Inc. "Breakthrough Video Technology Solves Persistent Image Problems with Florescent Lights and LEDs, While Maintaining Wide Dynamic Range." Mar. 2009.*
(Continued)

*Primary Examiner* — Imad Hussain
(74) *Attorney, Agent, or Firm* — Christie, Parker & Hale, LLP

(57) ABSTRACT

A drive recorder and a drive recorder system that can check the content of the image captured by an image capturing unit that outputs a video signal at a frequency not affected by LED traffic light flashing. The drive recorder includes an image converting unit for converting a received video signal into image information, and for outputting the image information in the form of a video signal, a storage unit for storing the converted image information, and a control unit for performing control so that the video signal is converted into the image information by using a first frequency not affected by LED traffic light flashing, and so that the image information stored in the storage unit is output in the form of a video signal by using a second frequency corresponding to a standard video signal.

16 Claims, 24 Drawing Sheets

(51) Int. Cl.

| | | |
|---|---|---|
| *H04N 5/765* | (2006.01) | |
| *H04N 5/77* | (2006.01) | |
| *H04N 5/907* | (2006.01) | |
| *H04N 7/18* | (2006.01) | |
| *H04N 9/804* | (2006.01) | |

(56) References Cited

U.S. PATENT DOCUMENTS

| | | | |
|---|---|---|---|
| 6,476,852 B1* | 11/2002 | Okada | 348/65 |
| 2002/0016671 A1* | 2/2002 | Shinada et al. | 701/211 |
| 2002/0047900 A1* | 4/2002 | Nishiyama et al. | 348/148 |
| 2003/0053003 A1* | 3/2003 | Nishi et al. | 348/744 |
| 2003/0098927 A1* | 5/2003 | Oh | 348/558 |
| 2004/0160786 A1* | 8/2004 | Bauer et al. | 362/545 |
| 2004/0201765 A1* | 10/2004 | Gammenthaler | 348/333.01 |
| 2005/0001932 A1* | 1/2005 | Masuda et al. | 348/563 |
| 2005/0151666 A1* | 7/2005 | Saban et al. | 340/815.45 |
| 2005/0162561 A1* | 7/2005 | Nagamine et al. | 348/638 |
| 2005/0194915 A1* | 9/2005 | Elsheimer et al. | 315/291 |
| 2006/0077351 A1* | 4/2006 | Park et al. | 353/31 |
| 2006/0203092 A1* | 9/2006 | Nobori et al. | 348/148 |
| 2007/0046808 A1* | 3/2007 | Sagawa et al. | 348/362 |
| 2007/0067079 A1* | 3/2007 | Kosugi | 701/35 |
| 2008/0122606 A1* | 5/2008 | Bradley | 340/468 |
| 2008/0122607 A1* | 5/2008 | Bradley | 340/468 |
| 2009/0135271 A1* | 5/2009 | Kurane | 348/222.1 |
| 2009/0309972 A1* | 12/2009 | Tonokawa et al. | 348/148 |
| 2011/0128532 A1* | 6/2011 | Taira | 356/218 |

FOREIGN PATENT DOCUMENTS

| | | |
|---|---|---|
| JP | 07-327204 | 12/1995 |
| JP | 2003-60984 | 2/2003 |
| JP | 2003-151042 | 5/2003 |
| JP | 2004-266373 | 9/2004 |
| JP | 2004-357295 | 12/2004 |
| JP | 2005-301518 | 10/2005 |
| JP | 2006-079990 | 3/2006 |
| JP | 2006-86730 | 3/2006 |
| JP | 2006-246106 | 9/2006 |
| JP | 2007-161189 | 6/2007 |
| JP | 2007-164775 | 6/2007 |

OTHER PUBLICATIONS

Wada, M.; Yendo, T.; Fujii, T.; Tanimoto, M.; , "Road-to-vehicle communication using LED traffic light," Intelligent Vehicles Symposium, 2005. Proceedings. IEEE , vol., No., pp. 601-606, Jun. 6-8, 2005.*

Pang, G.K.H.; Liu, H.H.S.; , "LED location beacon system based on processing of digital images ," Intelligent Transportation Systems, IEEE Transactions on , vol. 2, No. 3, pp. 135-150, Sep. 2001.*

Kubo, N., et al., *LED Traffic Signals on Motion Pictures of Drive Data Recorders*, Japan Automobile Research Journal, vol. 28, No. 7, Jul. 2006, pp. 91-94 with English Abstract (previously listed as "On Order".

International Search Report, dated Mar. 11, 2008, corresponding to PCT/JP2008/050669.

"Effects of LED Traffic Lights on Images Captured by Drive Recorder," Japan Automobile Research Journal, vol. 28, No. 7, Jul. 2006 (On Order).

* cited by examiner

Fig.1
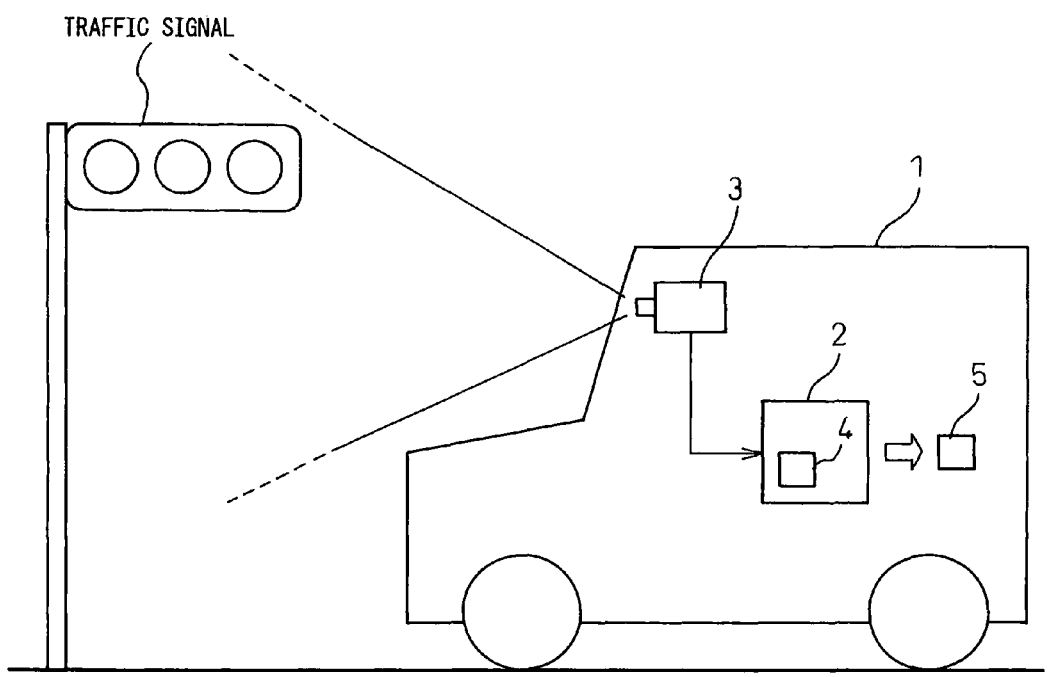
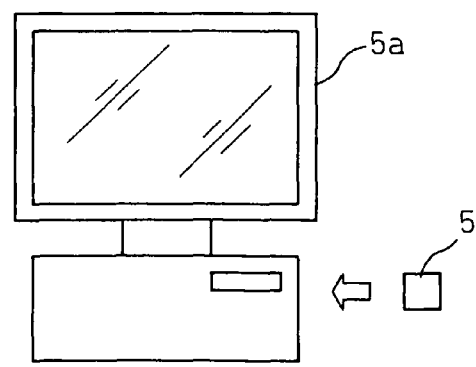

Fig.4(a)

| | EAST | WEST |
|---|---|---|
| NTSC | 0.05 | 8.33 |
| PAL | 0.00 (NO FLASHING) | 0.05 |

Fig.4(b)

| | EAST | WEST |
|---|---|---|
| NTSC | DOES NOT COINCIDE | DOES NOT COINCIDE |
| PAL | COINCIDES | DOES NOT COINCIDE |

Fig.6(a)

| | EAST | WEST |
|---|---|---|
| NTSC | 0.02 | 2.78 |
| PAL | — (※1) | 0.02 |

※1: LED TRAFFIC LIGHT IN CAPTURED VIDEO APPEARS TO REMAIN OFF OR ON

Fig.6(b)

| | EAST | WEST |
|---|---|---|
| NTSC | OFF PERIOD IS SHORTER | OFF PERIOD IS LONGER |
| PAL | — (※2) | OFF PERIOD IS SHORTER |

※2: WHEN LED TRAFFIC LIGHT IN CAPTURED VIDEO APPEARS TO REMAIN OFF, OFF PERIOD IS SHORTER THAN YELLOW LIGHT ON PERIOD

DRIVE RECORDER, DRIVE RECORDER SYSTEM, VEHICLE-MOUNTED VIDEO RECORDING APPARATUS, AND VEHICLE-MOUNTED VIDEO RECORDING METHOD

CROSS-REFERENCE TO RELATED APPLICATION

This application is a National Phase Patent Application and claims the priority of International Application Number PCT/JP2008/050669, filed on Jan. 15, 2008, which claims priority of Japanese Patent Application Number 2007-032252, filed on Feb. 13, 2007, Japanese Patent Application Number 2007-072314, filed on Mar. 20, 2007, and Japanese Patent Application Number 2007-093986, filed on Mar. 30, 2007.

FIELD OF THE INVENTION

The present invention relates to a drive recorder, a drive recorder system, a vehicle-mounted video recording apparatus, and a vehicle-mounted video recording method, and more particularly to a drive recorder, drive recorder system, vehicle-mounted video recording apparatus, and vehicle-mounted video recording method for recording the view ahead of a vehicle by an onboard camera while the vehicle is traveling.

BACKGROUND OF THE INVENTION

In the prior art, a vehicle-mounted video recording apparatus has been proposed, generally known as a drive recorder, that records image information captured by an onboard video camera in a continuously circulating manner (hereinafter describe as "in an endless manner") and, in the event of an accident such as a vehicle collision, saves the thus recorded image information on another recording medium so that the images recorded before and after the accident can be used to investigate the cause of the accident (patent document 1).

As shown in FIG. 1, the drive recorder 2 is mounted inside the vehicle 1 and connected to the video camera 3 which captures the view ahead of the vehicle 1. The image information being captured by the video camera 3 is recorded in an endless manner on a semiconductor memory device incorporated in the drive recorder 2. When vehicle 1 is involved in a vehicle accident or the like, the impact is detected by a gravitational acceleration sensor 4, whereupon the drive recorder 2 determines the situation as being the occurrence of an accident and transfers the captured image information recorded on the semiconductor memory device to a recording card 5 for saving. Images recording the view ahead of the vehicle 1 for a period of several seconds before and after the accident are thus saved on the card.

The captured image information saved on the recording card 5 can be reproduced in the form of video on a reproduction apparatus 5a such as a PC to investigate the cause of the accident. In particular, in the case of an accident at an intersection where traffic lights for vehicles (hereinafter referred to as "traffic lights," which include not only those for vehicles but also those for pedestrians and bicycles) are installed, the illumination state of each traffic light at the time of the occurrence of the accident may be captured in the recorded images, in which case the state of the traffic light provides an extremely effective means for judging the condition of the traffic at the time and the responsibility of the persons involved.

In Japan, LEDs (Light-Emitting Diodes) have been used for traffic lights since 1994. Since the power used to operate such LED traffic lights is produced by full-wave rectifying the commercial power, the applied voltage varies at twice the frequency of the commercial power, i.e., at 100 Hz in eastern Japan and at 120 Hz in western Japan. Furthermore, LEDs need a voltage greater than a predetermined level to operate. LED traffic lights are therefore designed to illuminate when a voltage greater than about one half of the supply voltage is applied. Accordingly, unlike traditional bulb-based traffic lights which continuously illuminate, LED traffic lights illuminate by flashing on and off at twice the frequency of the commercial power.

In Japan, the frequency of the commercial power is 50 Hz in the eastern half of Japan and 60 Hz in the western half of Japan, the boundary between them being generally defined by a line joining the Fuji River in Shizuoka Prefecture and the Itoi River in Niigata Prefecture. In practice, the standard power frequency is determined for each electric power company in accordance with the provisions of the power supply contract, and the frequency of 50 Hz is used in Yamanashi Prefecture and Niigata Prefecture (except some regions), while the frequency of 60 Hz is used in Nagano prefecture (except for some regions) (see FIG. 2).

The video camera 3 which transmits the video signal to the drive recorder 2 captures an image at the video signal frequency (59.94 Hz) defined by the NTSC (National Television System Committee) standard or at the video signal frequency (50 Hz) defined by the PAL (Phase Alternating Line) standard, and outputs the video signal corresponding to the captured image. Generally, TV monitors and LCD monitors are designed to display images at the video signal frequency defined by the NTSC or PAL standard.

In these circumstances, when an image of an LED-based traffic signal is captured by the video camera, there can occur cases where the color of the traffic light in the traffic signal is unrecognizable in the captured image because of the relationship between the flashing frequency of the traffic light (120 Hz or 100 Hz) and the video capture frequency of the video camera (59.94 Hz or 50 Hz).

Furthermore, images captured by the drive recorder are checked on the screen of a personal computer (PC) by reading a recording medium or the like provided in the drive recorder into the PC. However, in the case of a method that checks the captured image at a later time at some other location, the possibility of the captured images being tampered with cannot be ruled out.

If the images captured from the scene of an accident can be checked on the spot, the problem of such image tampering can be avoided. That is, it is extremely important that the images captured by the drive recorder be checked on the display of a navigation system or the like mounted in the vehicle.

However, in the prior art, when the images captured by the drive recorder are displayed on the onboard display unit, there arises the earlier described problem due to the LED traffic light flashing and the video capture timing. The reason for this will be described below.

FIG. 3 is a diagram showing the relationship between the LED traffic light flashing and the video capture timing.

FIG. 3(a) shows the case where images of the traffic light flashing on and off at 100 Hz are captured with the capture timing of 50 Hz. In the figure, "A" indicates the timing when the images are captured when the light is the brightest, and "B" indicates the timing when the images are captured when the light is the darkest. That is, in the case of "A", the color of the traffic light is recognizable in all the captured images, but in the case of "B", the color of the traffic light is recognizable in none of the captured images. That is, when the flashing frequency of the traffic light coincides with an integral multiple of the video capture frequency, there occur cases, as indicated by "B", in which the color of the traffic light is unrecognizable in the captured video.

FIG. 3(b) shows the case where images of the traffic light flashing on and off at 100 Hz are captured with the timing of 45 Hz. C1 to C16 indicate the video capture timing instants. In this case, since the flashing frequency of the traffic light does not coincide with an integral multiple of the video capture frequency, the traffic light in the captured video flashes on and off at a frequency fb (Hz). For example, in the images captured at C1, C2, C5, C6, C9, C10, C11, C14, and C15, the color of the traffic light is recognizable. In this way, when the flashing frequency of the traffic light does not coincide with an integral multiple of the video capture frequency, the color of the traffic light can be recognized at some of the video capture instants.

The relationship between the flashing frequency fs (Hz) of the traffic light and the flashing frequency fb (Hz) of the traffic light in the captured video is defined by the following equation (1), wherein fr (Hz) is the video capture frequency, and n is an integer that makes fr×n a value closest to fs.

$$fb = |fs - fr \times n| \quad (1)$$

For example, when equation (1) is applied to the case of FIG. 3(b), fb=(100−45×2)=10 (Hz), which means that the traffic light in the captured video flashes on and off at 0.1-second intervals.

FIG. 4(a) is a diagram showing the flashing cycle (in seconds) of an LED traffic light in the captured video when the traffic light is captured using the NTSC or PAL standard in eastern Japan, for comparison with that in western Japan. When the traffic light is captured using the PAL standard in eastern Japan, the flashing cycle of the traffic light is 0.00 second. That is, in this case only, the traffic light does not flash. FIG. 4(b) is a diagram showing the relationship between the flashing cycle of the traffic light and the capture timing when the traffic light is captured using the NTSC or PAL standard in eastern Japan, for comparison with that in western Japan. When the traffic light is captured using the PAL standard in eastern Japan, since the traffic light does not flash in the captured video the flashing cycle of the traffic light coincides with the capture timing. This means that when the traffic light is captured using the PAL standard in eastern Japan, there can occur cases where the traffic light appears to remain off in the captured video, and in such cases, the color of the traffic light is unrecognizable in the captured video.

FIG. 5 is a diagram showing the case where an LED traffic light flashing on and off at 120 Hz in western Japan is captured at the video signal frequency (59.94 Hz) defined by the NTSC standard. In the figure, the ordinate represents the voltage applied to the LED traffic light, and the abscissa represents the time (in seconds). It is assumed here that when a voltage not lower than a threshold voltage S corresponding to one half of the supply voltage is applied, the LED illuminates and the color of the traffic light is recognizable but, when a voltage lower than the threshold voltage S is applied, the LED does not illuminate sufficiently and the color of the traffic light becomes unrecognizable. Further, curve C is a plot, as a function of time, of the voltage applied to the LED traffic light at the video capture timing.

In the case of FIG. 5, the flashing frequency of the traffic light in the captured video is 0.12 (Hz) from equation (1), and the flashing cycle is about 8.33 seconds. This means that the curve C cycles on and off in about every 8.33 seconds. In FIG. 5, during the period from time t0 to time t1 and the period from time t2 to time t3, since the applied voltage is not lower than the threshold voltage S, the LED illuminates and the color of the traffic light is recognizable. On the other hand, during the period from time t1 to time 2 in FIG. 5, since the applied voltage is lower than the threshold voltage S, the LED does not illuminate sufficiently and the color of the traffic light becomes unrecognizable. That is, throughout the period from time t1 to time 2, which lasts about 2.78 seconds (about one third of the flashing cycle), the color of the traffic light cannot be recognized. In particular, if that period overlaps the ON period of the yellow light (about two seconds), the illumination state of the yellow light becomes unrecognized. In this case, if the video captured, for example, when the vehicle entered an intersection is reproduced, it is not possible to determine whether the traffic light was showing yellow or red at that moment, and thus it is not possible to investigate the situation that occurred at the intersection.

FIG. 6(a) is a diagram showing the length of time (in seconds) during which the LED traffic light appears to remain off in the captured video. Each numeric value shown here corresponds to one third of the flashing cycle shown in FIG. 4(a). FIG. 6(b) is a diagram showing the relationship between the yellow light ON period (about two seconds) and the period during which the LED traffic light appears to remain off in the captured video. When the traffic light is captured using the NTSC standard in western Japan, the period during which the LED traffic light appears to remain off in the captured video is longer than the yellow light ON period. That is, there can occur cases where only images of the yellow light in the OFF state are captured, and in such cases, the state of the traffic light cannot be recognized in the captured video.

The above description has been given by an example in which, of the LED traffic lights, the yellow light having the shortest ON period becomes unrecognizable. On the other hand, in the case of traffic lights for pedestrians or bicycles that do not have yellow lights, the light having the shortest ON period becomes unrecognizable. That is, in the case of traffic lights for pedestrians, the flashing green light period is the shortest (about 0.5 to 1 second).

In this way, when images of an LED traffic light are captured by the video camera of the drive recorder, there can occur cases where the color of the traffic light is not recognizable in the captured images, depending on the relationship between the flashing frequency of the traffic light and the video capture timing. This problem occurs in western Japan (120 Hz) when the video camera is based on the NTSC standard (59.94 Hz) and in eastern Japan (100 Hz) when the video camera is based on the PAL standard (50 Hz).

To address this problem, it has been proposed to adjust the capture frame rate and the camera shutter speed (nonpatent document 1).

The capture frame rate of the drive recorder is adjusted so that the frame rate does not become equal to a submultiple of the frequency of the commercial power. For example, if it is set to 30.5 frames per second, blinking or flicker may appear in the captured image of the LED traffic light, but the light does not totally black out, and the illumination state of the traffic light can be recognized. The shutter speed is adjusted so that it becomes slower than the reciprocal of the flashing frequency of the LED device. For example, when the flashing frequency of the LED is 100 Hz, the shutter speed is set slower than $1/100$ seconds, and when it is 120 Hz, the shutter speed is set slower than $1/120$ seconds; by so adjusting the shutter speed, the illumination state of the traffic light becomes recognizable. However, adjusting the shutter speed may lead to shaky images in the case of daytime shooting, making it difficult to investigate an accident or the like by using the recorded images.

Patent document 1: Japanese Unexamined Patent Publication No. S63-16785

Nonpatent document 1: "Effects of LED Traffic Lights on Images Captured by Drive Recorder," Japan Automobile Research Journal, Vol. 28, No. 7 (July 2006)

SUMMARY OF THE INVENTION

In consideration of the foregoing, one possible solution would be to use a camera having a video capture frequency whose integral multiple does not coincide with the flashing frequency of LED traffic lights (100 Hz or 120 Hz) in eastern Japan as well as in western Japan, thereby preventing the occurrence of a period during which the color of any traffic light becomes unrecognizable for an extended period of time, that is, a camera that captures an image at a frequency not affected by LED traffic light flashing and that outputs a video signal based on the thus captured image. Further, when such a camera is used, one might want to check the captured image to see if the color of the traffic light is really recognizable.

However, with conventional display monitors, there arises the problem that if the video signal is received directly from the camera that outputs the video signal at a frequency not affected by the LED traffic light flashing in both eastern Japan and western Japan, the image cannot be displayed on the monitor because the monitor operates at a standard video signal frequency.

In view of this, it is an object of the present invention to provide a drive recorder and a drive recorder system that solve the above problems such as the color of the traffic light becoming unrecognizable for an extended period of time.

It is another object of the invention to provide a drive recorder and a drive recorder system that can check the content of the image captured by an image capturing unit that outputs a video signal at a frequency not affected by LED traffic light flashing.

As earlier described, the frequency of the commercial power differs between the eastern and western halves of Japan, the boundary between them being defined as shown in FIG. 2; therefore, when the vehicle travels only in the eastern or western half of Japan, image capturing should be performed using the NTSC standard in eastern Japan or the PAL standard in the western Japan. However, when the vehicle traveling in eastern Japan moves into western Japan where the frequency of the commercial power is different, there arises the problem that the traffic light appears to remain off in the captured video, as previously described.

On the other hand, when the capture frame rate of the camera is adjusted as earlier described, the illumination state of the traffic light becomes recognizable, but the images captured using a nonstandard frame rate cannot be displayed directly on the onboard monitor. Generally, the onboard monitor is designed to display only standard video signals. As a result, a nonstandard monitor specifically designed to check the images captured by the camera has to be installed at the time of the installation of the camera, and this adds to the complexity of the installation work.

In view of the above situation, it is an object of the present invention to provide a vehicle-mounted video recording apparatus and a vehicle-mounted video recording method that can record images of the scene of an accident, etc., including LED traffic lights, irrespective of the frequency of the commercial power used in the area, while preventing the LED traffic lights from appearing to remain off in the captured video.

It is another object of the present invention to provide a vehicle-mounted video recording apparatus and a vehicle-mounted video recording method that can check the captured images on the onboard monitor without having to install a separate monitor at the time of the installation of the camera.

A drive recorder according to the present invention includes an image converting unit for converting a received video signal into image information, and for outputting the image information in the form of a video signal, a storage unit for storing the converted image information, and a control unit for performing control so that the video signal is converted into the image information by using a first frequency not affected by LED traffic light flashing, and so that the image information stored in the storage unit is output in the form of a video signal by using a second frequency corresponding to a standard video signal.

In an alternative aspect, a drive recorder according to the present invention includes an image converting unit for converting a received video signal into image information, and for outputting the image information in the form of a video signal, a storage unit for storing the converted image information, a frequency switching unit for switching between a first frequency not affected by LED traffic light flashing and a second frequency corresponding to a standard video signal, and a control unit for controlling the image converting unit and the frequency switching unit so that the video signal is converted into the image information by using the first frequency, and so that the image information stored in the storage unit is output in the form of a video signal by using the second frequency.

In another alternative aspect, a drive recorder according to the present invention includes an image converting unit for converting a received video signal into image information, and for outputting the image information in the form of a video signal, a storage unit for storing the converted image information, a frequency switching unit for switching among a first frequency not affected by LED traffic light flashing and a plurality of standard frequencies corresponding to a plurality of standard video signals, and a control unit for controlling the image converting unit and the frequency switching unit so that the video signal is converted into the image information by using the first frequency, and so that the image information stored in the storage unit is output in the form of a video signal by using a selected one of the plurality of standard frequencies.

In still another alternative aspect, a drive recorder according to the present invention includes a first image converting unit for converting a received video signal into image information by using a first frequency not affected by LED traffic light flashing, a storage unit for storing the converted image information, a second image converting unit for outputting the image information in the form of a video signal by using a second frequency corresponding to a standard frequency, and a control unit for controlling the first and second image converting units so that the video signal is converted into the image information, and so that the image information stored in the storage unit is output in the form of a video signal.

In the drive recording according to the present invention, since switching can be made between the frequency not affected by the LED traffic light flashing and the frequency corresponding to the standard video signal, the content of the image captured by an image capturing unit that outputs the video signal at the frequency not affected by the LED traffic light flashing can be easily checked.

In an alternative aspect, a drive recorder according to the present invention includes a storage unit for storing an image signal created based on a first video signal that is input as a video signal corresponding to a frequency not affected by LED traffic light flashing, and a video signal switching unit for directing the first video signal to the storage unit, and for directing to a display a second video signal that is input as a video signal corresponding to a standard frequency for display.

A drive recording system according to the present invention includes an image capturing unit for outputting a first video signal corresponding to a frequency not affected by LED traffic light flashing and a second video signal corresponding to a standard frequency, a drive recording for converting the first video signal input thereto into image information, and for storing the image information, a display unit for displaying the second video signal, and a video signal switching unit for directing the first video signal from the image capturing unit to the drive recorder, and for directing the second video signal from the image capturing unit to the display unit.

In the drive recorder and the drive recording system according to the present invention, since provisions are made so that the video signal corresponding to the standard frequency can be directed to the display unit from the image capturing unit that can switch between the video signal corresponding to the frequency not affected by the LED traffic light flashing and the video signal corresponding to the standard frequency, the operation of the image capturing unit that outputs the video signal at the frequency not affected by the LED traffic light flashing can be easily checked.

A vehicle-mounted video recording apparatus according to the present invention includes scheme selection unit for selecting, based on vehicle location, an appropriate one of a plurality of standardized video processing schemes, and recording unit for recording video information based on the selected video processing scheme. Since the appropriate video processing scheme is selected based on vehicle location from among the plurality of standardized video processing schemes, video can be recorded using the video processing scheme that matches the vehicle location. Accordingly, the video can be recorded, for example, without causing the video recording cycle to become synchronized to the OFF cycle of the LED traffic lights installed in the region where the vehicle is located. Furthermore, the captured video can be readily checked on the onboard monitor without having to install an additional monitor at the time of the installation of the camera.

Preferably, in the vehicle-mounted video recording apparatus according to the present invention, the selected video processing scheme performs video processing such that the video capture cycle does not become synchronized to the LED traffic light flashing cycle and such that the period throughout which the LED traffic lights appear to remain off in the captured video is shorter than the ON period of any light in the traffic lights. Since provisions are made to select, from among the plurality of standardized video processing schemes, the video processing scheme that performs video processing such that the video capture cycle does not become synchronized to the LED traffic light flashing cycle and such that the period throughout which the LED traffic lights appear to remain off in the captured video is shorter than the ON period of any light in the traffic lights, images can be recorded using the video processing scheme that matches the vehicle location. Accordingly, there is no possibility of all the LED traffic lights simultaneously appearing to remain off in the images captured in the region where the vehicle is located, and the illumination state of each traffic light can be captured.

That is, since the illumination state of the yellow light having the shortest ON period can be captured at one or other video capture timing instant, the illumination states of the red and green lights each having a longer ON period than the yellow light can also be captured. Furthermore, the captured video can be readily checked on the onboard monitor without having to install an additional monitor at the time of the installation of the camera.

In an alternative aspect, a vehicle-mounted video recording apparatus according to the present invention includes location detection unit for detecting vehicle location, region detection unit for detecting whether the detected location is in a first commercial power region or a second commercial power region, scheme selection means for selecting an NTSC-based video processing scheme or a PAL-based video processing scheme, whichever is appropriate to the detected region; and recording means for recording video information based on the selected video processing scheme. Since provisions are made to detect whether the vehicle is located in the first commercial power region or the second commercial power region, and to select the NTSC-based video processing scheme or the PAL-based video processing scheme, whichever is appropriate to the detected region, video can be recorded using the video processing scheme that matches the region where the vehicle is located. Accordingly, the video can be recorded, for example, without causing the video recording cycle to become synchronized to the OFF cycle of the LED traffic lights installed in the region where the vehicle is located. Furthermore, the captured video can be readily checked on the onboard monitor without having to install an additional monitor at the time of the installation of the camera.

A vehicle-mounted video recording method according to the present invention includes the steps of selecting, based on vehicle location, an appropriate one of a plurality of standardized video processing schemes, and recording video information based on the selected video processing scheme. Since provisions are made to select, based on the vehicle location, the appropriate video processing scheme from among the plurality of standardized video processing schemes, video can be recorded using the video processing scheme that matches the region where the vehicle is located. Accordingly, the video can be recorded, for example, without causing the video recording cycle to become synchronized to the OFF cycle of the LED traffic lights installed in the region where the vehicle is located. Furthermore, the captured video can be readily checked on the onboard monitor without having to install an additional monitor at the time of the installation of the camera.

BRIEF DESCRIPTION OF THE DRAWINGS

FIG. 1 is a diagram showing an example in which a drive recorder 2 is mounted in a vehicle 1.

FIG. 4(a) is a diagram showing the flashing cycle of an LED traffic light in captured video, and FIG. 4(b) is a diagram showing the relationship between the flashing cycle of the LED traffic light in the captured video and the capture timing.

FIG. 6(a) is a diagram showing the length of time during which the LED traffic light appears to remain off in the captured video, and FIG. 6(b) is a diagram showing the relationship between the yellow light ON period and the period during which the LED traffic light appears to remain off in the captured video.

DETAILED DESCRIPTION OF THE PREFERRED EMBODIMENT

A drive recorder, a drive recorder system, a vehicle-mounted video recording apparatus, and a vehicle-mounted video recording method according to the present invention will be described below with reference to the drawings. It should, however, be noted that the technical scope of the present invention is not limited to the specific embodiments described herein, but extends to the inventions described in the appended claims and their equivalents.

Figure 7:
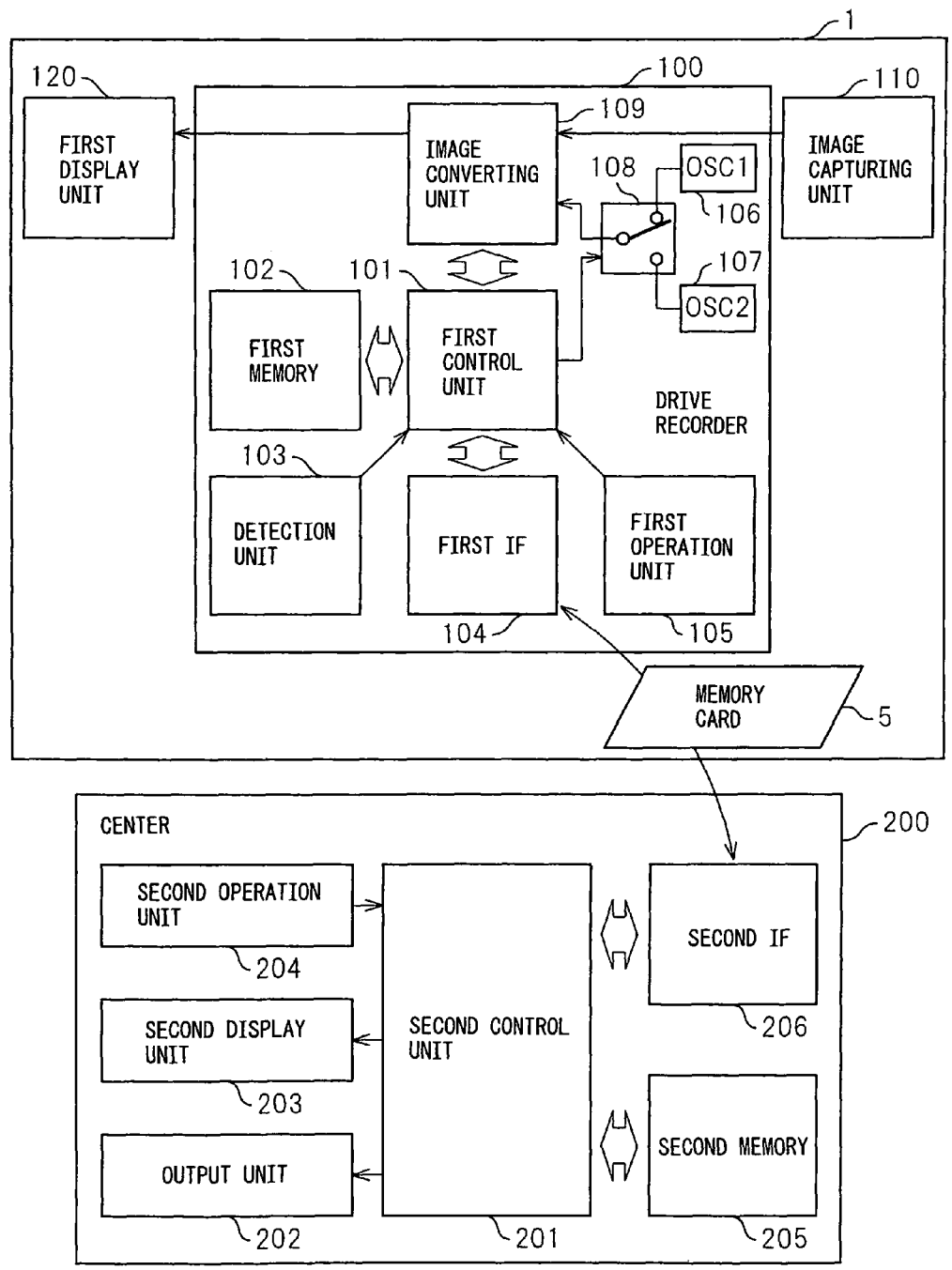
FIG. 7 is a block diagram schematically showing the configuration of a system comprising a drive recorder.

FIG. 7 is a block diagram schematically showing the configuration of a system comprising a drive recorder.

The system includes, in addition to the drive recorder 100 mounted in a vehicle 1, an image capturing unit 110, a first display unit 120 constructed from an LCD monitor or the like that is driven at a frequency corresponding to that of a standard video signal, a memory card 5 for saving an image recorded in the drive recorder 100 during the occurrence of an event, and a center terminal 200 for reproducing the image saved on the memory card 5. The drive recorder 100 may be constructed so as to include the image capturing unit 110 and/or the first display unit 120. The display unit of a navigation system may be used as the first display unit 120. Further, the drive recorder 100 may be incorporated into the navigation system containing the first display unit 120.

The drive recorder 100 includes a first control unit 101 comprising a CPU, ROM, RAM, etc., a first memory 102 for temporarily storing images, a detection unit 103 constructed from a G (acceleration) sensor or the like, a first memory card IF (interface) 104 having a slot into which the memory card 5 is inserted to perform operations such as writing images to the memory card 5, a first operation unit 105 comprising switches, buttons, etc., a first frequency oscillator 106 corresponding to the frequency of the video signal received from the image capturing unit 110, a second frequency oscillator 107 corresponding to the frequency of the video signal to be output to the first display unit 120, a frequency switching unit 108 for switching between the first frequency and the second frequency, and an image converting unit 109 for converting the video signal received from the capturing unit 110 into image information and for outputting the image information as the video signal to the first display unit 120.

The G sensor included in the detection unit 103 detects gravitational acceleration in two axis directions (X axis and Y axis) perpendicular to each other. The G sensor is mounted inside the vehicle so that the direction (positive direction) of the Y axis of the G sensor coincides with the forward direction of the vehicle and the direction (positive direction) of the X axis of the G sensor coincides with the rightward direction of the vehicle. Accordingly, based on the detection signal G (Gx, Gy) output from the G sensor, the first control unit 101 can determine whether an impact has been applied to the vehicle and from which direction the impact has been applied to the vehicle. Gx represents the gravitational acceleration in the X-axis direction, and Gy the gravitational acceleration in the Y-axis direction.

The image capturing unit 110 comprises a CCD camera that captures an image at a frequency not affected by LED traffic light flashing and outputs a video signal based on the thus captured image. A description will be given below of the frequency not affected by the LED traffic light flashing.

As previously shown by equation (1), the traffic light in the captured video repeats flashing on and off with a flashing cycle of 1/fb (s). The problem here is the occurrence of a period throughout which the color of the traffic light becomes unrecognizable for an extended period of time. Considering that the voltage waveform applied to the LED is sinusoidal and that the color of the LED traffic light becomes recognizable when a voltage greater than one half of the supply voltage is applied, it is considered that the period throughout which the color of the traffic light is unrecognizable corresponds to one third of the flashing cycle.

Figure 5:
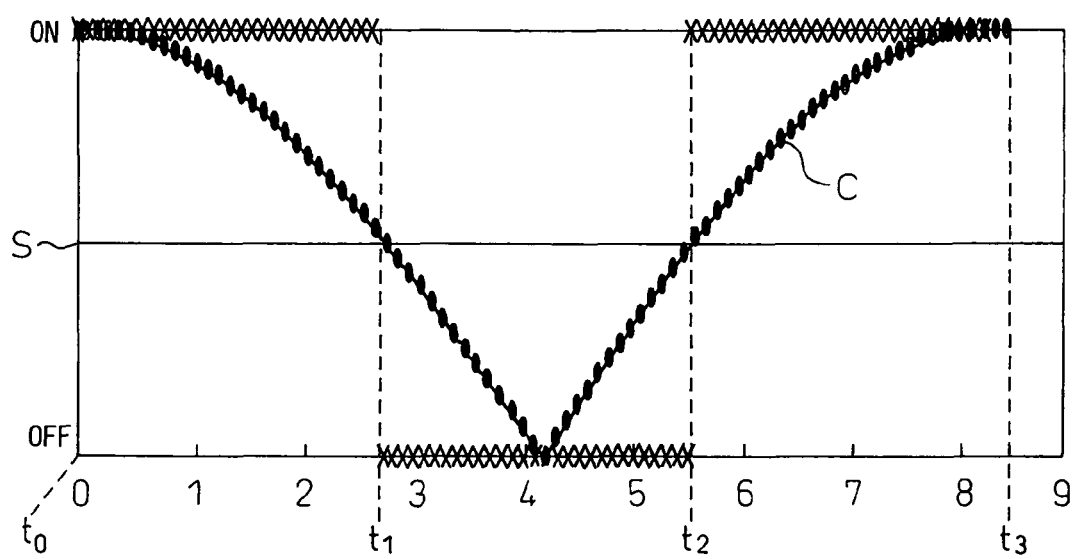
FIG. 5 is a diagram showing an example of the flashing of the LED traffic light in the captured video.

Of the three colors, red, yellow, and green, used in LED traffic lights, the ON period of the yellow light is the shortest at about 2 seconds. Accordingly, if the color of the traffic signal is to be recognized correctly, one third of the flashing cycle (that is, the OFF period from t1 to t2 such as shown in FIG. 5) must be made at least shorter than the ON period of the yellow LED. If the ON period of the yellow LED is two seconds, then from equation (1) the video capture frequency fr (Hz) can be determined that satisfies the relation 1/(3fb)≤2. Since the traffic light flashing frequency fs is 100 (Hz) in eastern Japan and 120 (Hz) in western Japan, the relation 1/(3fb)≤2 must be satisfied for both of the flashing frequencies fs.

That is, the video capture frequency fr that satisfies both of the following equations (2) and (3) is the frequency not affected by the LED traffic light flashing.

$$|100 - fr \times n| = fb \geq \frac{1}{6} \quad (2)$$

$$|120 - fr \times n| = fb \geq \frac{1}{6} \quad (3)$$

This shows that the video capture frequency fr should be chosen so that fr≥60.06 (Hz), 59.94 (Hz)≥fr≥50.06 (Hz), or fr≥49.94 (Hz).

In view of the above, in the present system, a CCD camera having a capture frequency of 59.5 Hz is used for the image capturing unit 110. In this case, according to equation (3), since the flashing frequency fb is 1 Hz, and the flashing cycle is 1 second, the OFF period is about 0.3 second which is one third of the flashing cycle. Similarly, according to equation (2), the OFF period is 0.02 second. As a result, every color used in LED traffic lights becomes recognizable in the captured video, whether in eastern Japan or in western Japan. Accordingly, the first frequency corresponding to the first frequency oscillator 106 is chosen to be 59.5 Hz, and the first frequency oscillator 106 is configured to output a clock signal having a clock frequency for creating the first frequency. Specifically, to create the first frequency (59.5 Hz), the clock frequency of the first frequency oscillator 106 may be set to 12.182625 MHz (or 13.376785 MHz). The first frequency (59.5 Hz) chosen here is one example, and use may be made of some other frequency that falls within the frequency range not affected by the LED traffic light flashing. If the image were captured at the frequency (59.94 Hz) employed for the NTSC standard video signal, then the traffic light in the image, if captured in western Japan, would repeatedly flash on and off with a flashing cycle of 1/fb (s), i.e., about 8.33 seconds, and the color of the traffic light would become unrecognizable throughout one third of the flashing cycle, i.e., about 2.8 seconds, which would be undesirable (see FIG. 5).

The above equations (2) and (3) have been constructed for the case where the frequency not affected by the LED traffic light flashing is determined so that the period throughout which the color of the traffic light becomes unrecognizable is held shorter than the ON period of the yellow LED, i.e., two seconds, and it is to be understood that the range that fr can take varies depending on how the period throughout which the color of the traffic light becomes unrecognizable is determined.

The first display unit 120 comprises an LCD monitor that displays the video signal output at the NTSC standard video signal frequency (59.94 Hz). Accordingly, the second frequency corresponding to the second frequency oscillator 107 is chosen to be 59.94 Hz, and the second frequency oscillator 107 is configured to output a clock signal having a clock frequency for creating the second frequency. Specifically, to create the second frequency (59.94 Hz), the clock frequency of the second frequency oscillator may be set to 12.272715 MHz (or 13.5 MHz). The onboard monitor may be used as the first display unit 120.

The center terminal 200 includes a second control unit 201 comprising a CPU, ROM, RAM, etc., an output unit 202 constructed from a printer or the like, a second display unit 203 constructed from a display or the like, a second operation unit 204 comprising a keyboard, mouse, etc., a second memory 205 for temporarily storing images, and a second memory card IF (interface) 206 having a slot into which the memory card 5 is inserted to perform operations such as reading images from the memory card 5. The center terminal 200 may be implemented as a PC (Personal Computer) having functions equivalent to the above functions.

A CF card having a 128-Mbyte storage capacity may be used as the memory card 5. The memory card 5 is inserted into the slot of the first memory card IF 104 and stores specific images recorded during the occurrence of an event. After that, the memory card 5 is removed from the slot of the first memory card IF 104, and is inserted into the slot of the second memory card IF 206, thus loading the stored images into the center terminal 200. Here, a CF card is used as the memory card 5, but alternatively, some other portable memory card, such as an SD card or a memory stick, or a removable HD or other portable storage medium may be used instead of the CF card. Further, a hard disk built into the drive recorder 100 may be used instead of the memory card 5; in that case, a transmitter circuit should be provided in the drive recorder 100 and a receiver circuit in the center terminal 200 so that the image data recorded on the hard disk can be transmitted to the center terminal 200 by means of wireless communications. Furthermore, the storage capacity of the memory card 5 is not specifically limited but can be determined as desired according to the purpose.

Figure 8:
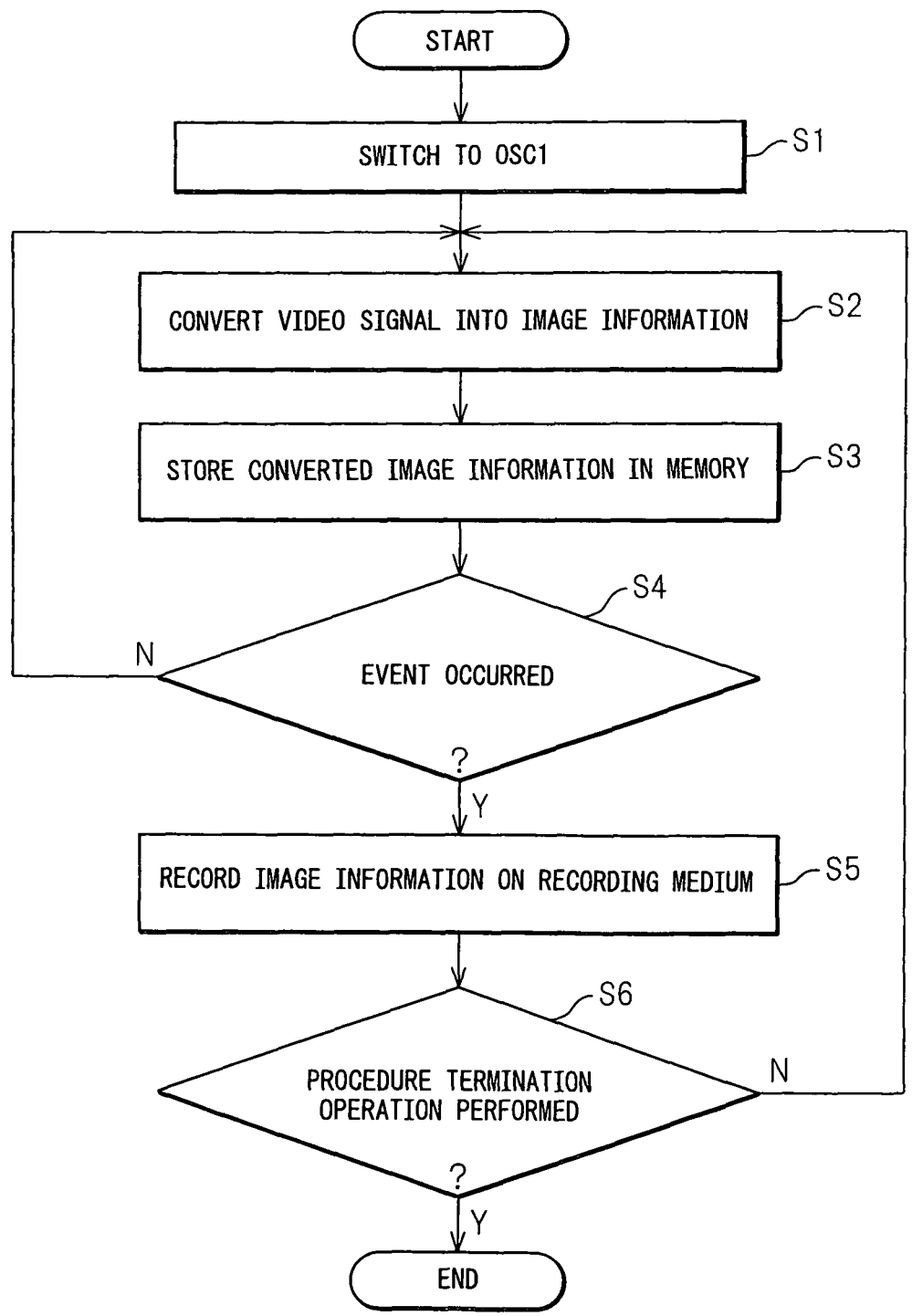
FIG. 8 is a flow diagram illustrating one example of an image information recording procedure performed by the drive recorder.

FIG. 8 is a flow diagram illustrating one example of an image information recording procedure performed by the drive recorder.

It is assumed that, before initiating the recording procedure shown in FIG. 8, power is turned on at least to the drive recorder 100 and the image capturing unit 110, and that the memory card 5 is loaded into the first memory card IF 104. It is also assumed that the recording procedure shown in FIG. 8 is executed with the first control unit 101 controlling each constituent element in accordance with a program prestored in the ROM or the like of the first control unit 101. Furthermore, it is assumed that the image capturing unit 110 includes a CCD camera that captures images at the first frequency (59.5 Hz) not affected by the LED traffic light flashing and that outputs the captured images in the form of a video signal.

First, the first control unit 101 switches the frequency switching unit 108 to select the clock frequency from the first frequency oscillator 106 so that the image converting unit 109 is driven at the clock frequency selected to create the first frequency (59.5 Hz) (S1).

The image converting unit 109 receives from the image capturing unit 110 the video signal corresponding to the first frequency, and converts it into image information (S2). In the present embodiment, 30 frames of images per second are created from the video signal received from the image capturing unit 110.

The first control unit 101 performs control so that the images thus converted by the image converting unit 109 are recorded in the first memory 102 in a continuously circulating manner, i.e., in an endless manner (S3). The system is constructed so that the image information equivalent, for example, to 60 seconds of converted images (1800 frames of images) is always held in the first memory 102.

Next, the first control unit 101 checks whether or not an event has occurred (S4). For example, when the G sensor of the detection unit 103 has detected gravitational acceleration greater than a predetermined threshold value, it can be determined that an event has occurred because an impact has been applied to the vehicle equipped with the drive recorder. Further, when a specific switch contained in the first operation unit 105 is turned on, it may be determined that an event has occurred by determining that a specific event for which the user wants to record images has occurred.

If it is determined in S4 that no event has occurred, steps S2 and S3 are repeated to continue to record the images in the first memory 103 in a continuously circulating manner.

If it is determined in S4 that an event has occurred, the first control unit 101 performs control so that 12 seconds of images (360 frames of images) recorded before the occurrence of the event and 8 seconds of images (240 frames of images) recorded after the occurrence of the event are recorded as image information for one event onto the memory card 5 (S5).

The first control unit 101 checks whether a procedure termination operation (such as power-off operation or the pressing of an end button) has been performed on the first operation unit 105 (S6), and if such a procedure termination operation has been performed, the image information recording procedure is terminated; otherwise, the process returns to step S2 to repeat the process from step S2 to step S6.

In this way, the drive recorder 100 operates so that the images that the image converting unit operating at the first frequency outputs by converting the video signal received from the image capturing unit 110 are stored in the first memory 102 in a continuously circulating manner until an event occurs, and the images thus stored are recorded on the memory card 5 only when an event has occurred.

The image information recorded on the memory card 5 in accordance with the recording procedure shown in FIG. 8 can be checked on the second display unit 203 by loading the memory card 5 into the second memory card IF 206 of the center terminal 200.

Figure 9:
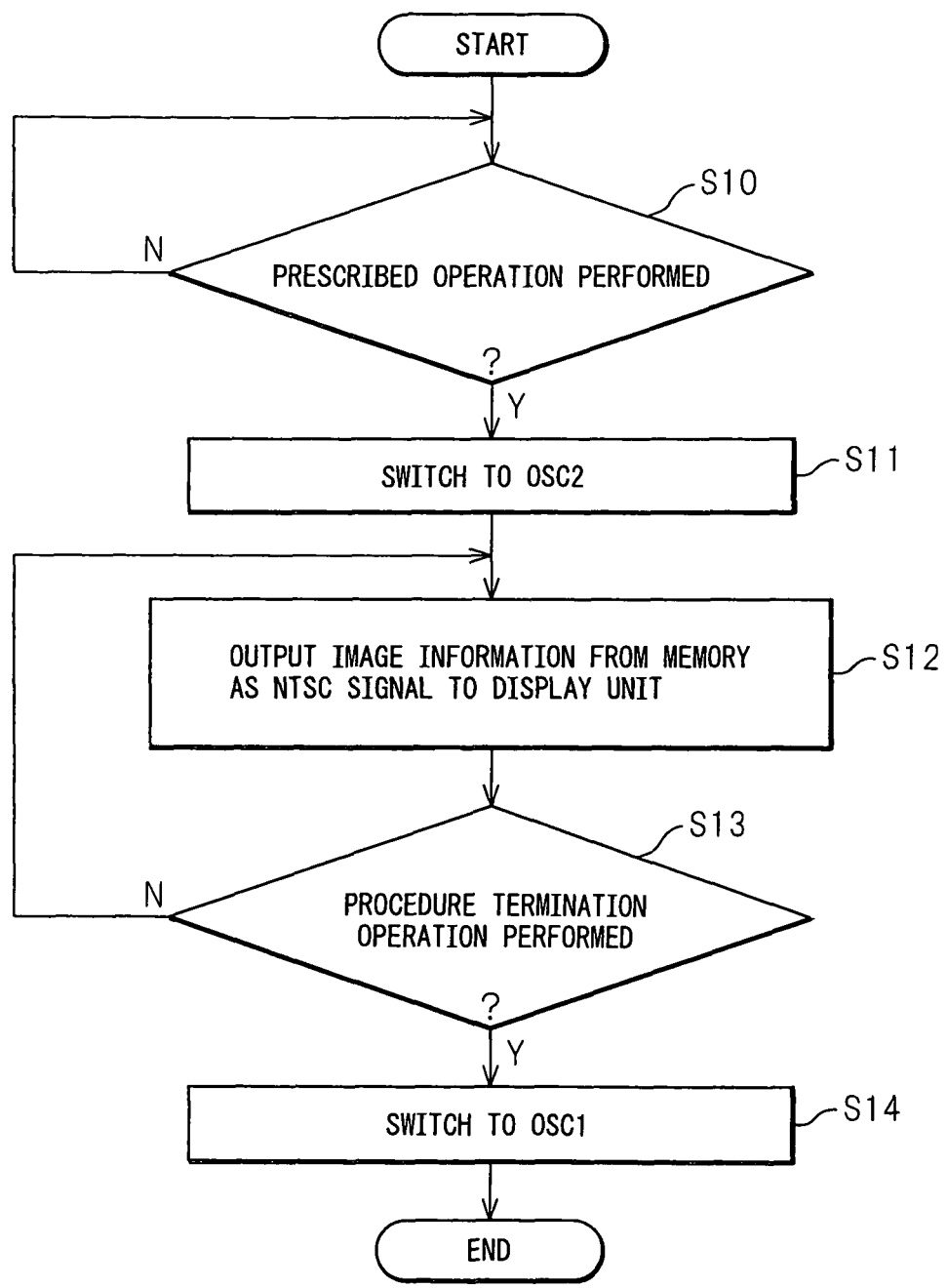
FIG. 9 is a flow diagram illustrating one example of an image information checking procedure performed by the drive recorder.

FIG. 9 is a flow diagram illustrating one example of an image information checking procedure performed by the drive recorder.

It is assumed here that, before initiating the checking procedure shown in FIG. 9, power is turned on at least to the drive recorder 100 and the display unit 120, and that the memory card 5 is loaded into the first memory card IF 104. It is also assumed that image information for at least one event is recorded on the memory card 5. Further, it is assumed that the checking procedure shown in FIG. 9 is executed with the first control unit 101 controlling each constituent element in accordance with a program prestored in the ROM or the like of the first control unit 101.

First, the first control unit 101 checks whether a prescribed operation (such as operation of a designated switch on the first operation unit 105 or special operation (pressing and holding) of a specific switch) has been performed for initiating the image information checking procedure (S10).

If, in S10, the prescribed operation has been performed on the first operation unit 105, the first control unit 101 switches the frequency switching unit 108 to select the clock frequency from the second frequency oscillator 107 so that the image converting unit 109 is driven at the clock frequency selected to create the second frequency (59.94 Hz, the NTSC standard video signal frequency) (S11).

Next, the first control unit 101 performs control so that the image information recorded on the memory card 5 is converted by the image converting unit 109 and output as a video signal corresponding to the second frequency to the first display unit 120 (S12). It is preferable to perform control so that the image information is sequentially output from the memory card 5 starting with the most recently recorded information.

Next, the first control unit 101 checks whether a procedure termination operation (such as power-off operation or the pressing of an end button) for terminating the image information checking procedure has been performed on the first operation unit 105 (S13); if such a procedure termination operation has not been performed yet, the process returns to S12 to continue to output the video signal to the first display unit 120.

If such a procedure termination operation has been performed in S13, the first control unit 101 switches the frequency switching unit 108 so that the image converting unit 109 is driven by using as the driving frequency the clock frequency corresponding to the first frequency (59.5 Hz) output from the first frequency oscillator 106 (S14). That is, the sequence of image information checking operations is terminated after setting the system back to the state ready to initiate the image information recording procedure shown in FIG. 8.

In the prior art, if a conventional camera is used that operates at the NTSC standard video signal frequency, the recorded information can be readily checked on the conventional display unit 120 that is driven at the NTSC standard video signal frequency (59.94 Hz). However, there has been the problem that, in western Japan, the images thus recorded are affected by LED traffic light flashing, and if on the other hand, an image capturing unit is used that captures images at the first frequency (59.5 Hz) not affected by the LED traffic light flashing, the recorded image information cannot be readily checked. In contrast, in the drive recorder 100 according to the present system, as described above, the image information recorded by receiving the video signal from the image capturing unit 110 that captures images at the first frequency (59.5 Hz) not affected by the LED traffic light flashing can be displayed on the conventional display unit 120 that is driven at the NTSC standard video signal frequency (59.94 Hz). In this way, the image information recorded on the memory card 5 can be readily checked on the conventional display monitor by using the image capturing unit 110 that captures images at the first frequency (59.5 Hz) not affected by the LED traffic light flashing and the conventional display unit 120 that is driven at the NTSC standard video signal frequency (59.94 Hz).

Figure 10:
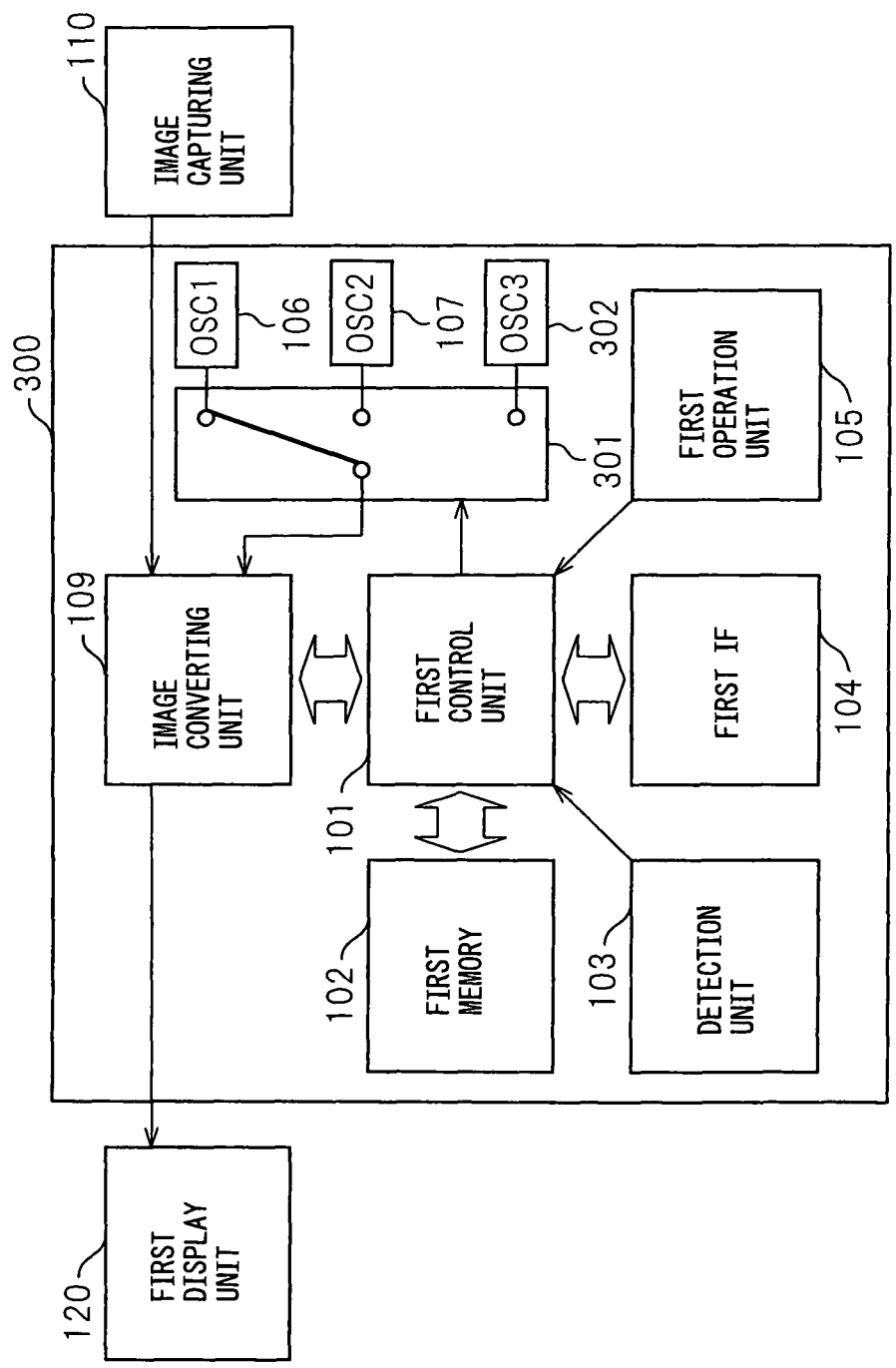
FIG. 10 is a block diagram schematically showing the configuration of a system comprising an alternative drive recorder.

FIG. 10 is a block diagram schematically showing the configuration of a system comprising an alternative drive recorder 300.

In FIG. 10, the same components as those in the system comprising the drive recorder 100 shown in FIG. 7 are designated by the same reference numerals. Further, in FIG. 10, the memory card 5 and the center terminal 200 are not shown. The only difference between the drive recorder 300 shown in FIG. 10 and the drive recorder 100 shown in FIG. 7 is that the drive recorder 300 shown in FIG. 10 includes a third frequency oscillator 302 and, correspondingly, the frequency switching unit 301 is configured to perform switching so that the frequency of one frequency oscillator selected from among the three frequency oscillators is supplied to the image converting unit 109. Accordingly, when recording the image information on the memory card 5, the image information from the image capturing unit 110 is recorded in accordance with the recording procedure earlier described with reference to FIG. 8.

In the drive recorder 300, the first frequency oscillator 106 outputs a clock signal having a clock frequency for creating the first frequency 59.9 Hz that is not affected by the LED traffic light flashing, and the second frequency oscillator 107 outputs a clock signal having a clock frequency for creating the second frequency 59.94 Hz employed for the NTSC standard video signal, while the third frequency oscillator 302 outputs a clock signal having a clock frequency for creating a third frequency 50 Hz which is the PAL standard video signal frequency. Specifically, to create the third frequency (50 Hz), the clock frequency of the third frequency oscillator may be set to 14.75 MHz (or 13.5 MHz). Further, it is to be understood that the first control unit 101 here is configured to be able to select the desired frequency oscillator by controlling the frequency switching unit 301 in accordance with a prescribed operation performed on the first operation unit 105.

The third frequency oscillator 302 is added to provide for the case where not the onboard monitor or the like, but a display unit dedicated to image information checking, in particular, a monitor that is driven with a clock frequency corresponding to the PAL standard video signal frequency (50 Hz) employed in some overseas countries, is used as the first display unit 120.

Accordingly, in the drive recorder 300 shown in FIG. 10, whatever video standard is employed for the first display unit 120 connected to it, the image information recorded on the memory card 5 can be readily checked by selecting the second or third frequency, whichever is appropriate, by operating the first operation unit 105. If it is desired to support some other video frequency standard in addition to the NTSC and PAL standards, a further additional oscillator that outputs a clock signal having a clock frequency for creating a fourth frequency, etc. should be provided, with provisions made to be able to select the appropriate frequency for use.

Figure 11:
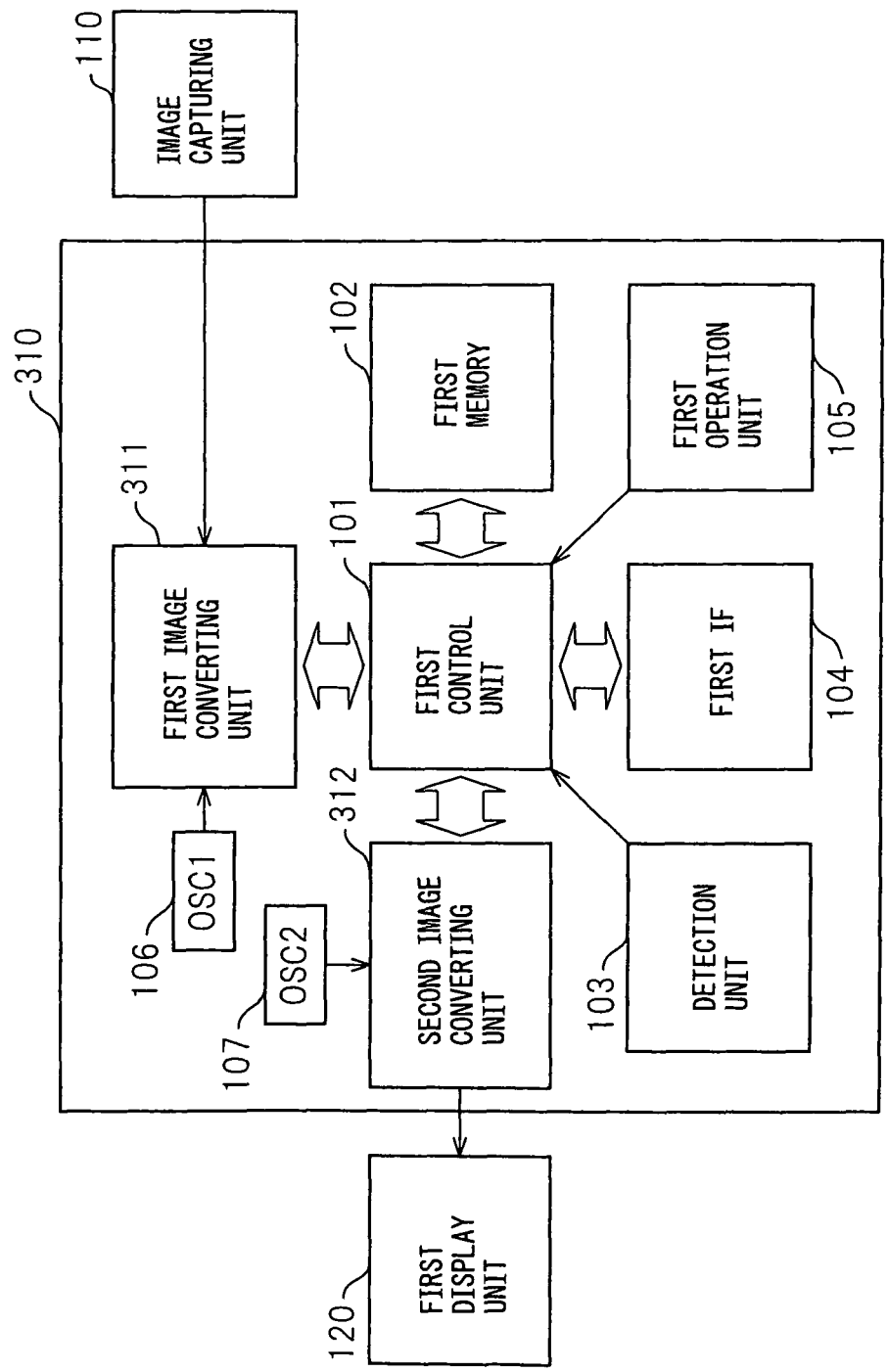
FIG. 11 is a block diagram schematically showing the configuration of a system comprising another alternative drive recorder.

FIG. 11 is a block diagram schematically showing the configuration of a system comprising another alternative drive recorder 310.

In FIG. 11, the same components as those in the system comprising the drive recorder 100 shown in FIG. 7 are designated by the same reference numerals. Further, in FIG. 11, the memory card 5 and the center terminal 200 are not shown. The difference between the drive recorder 310 shown in FIG. 11 and the drive recorder 100 shown in FIG. 7 is that the drive recorder 310 shown in FIG. 11 includes a first image converting unit 311 directly connected to the first frequency oscillator 106 and a second image converting unit 312 directly connected to the second frequency oscillator 107 so that the image information recorded on the memory card 5 can be checked without having to perform frequency switching using the frequency switching unit.

In the drive recorder 310, when transferring the image information from the image capturing unit 110 for recording on the memory card 5, control is performed so that the first image converting unit 311 converts the video signal into images by using the clock frequency corresponding to the first frequency (59.5 Hz) not affected by the LED traffic light flashing, and the images thus converted are recorded on the memory card 5. On the other hand, when outputting the video signal to the first display unit 120, control is performed so that the second image converting unit 312 outputs the video signal to the first display unit 120 by using the clock signal corresponding to the second frequency (59.94 Hz) which is the NTSC standard video signal frequency.

In this way, in the drive recorder 310 shown in FIG. 11, the image information recorded on the memory card 5 can be checked without having to perform frequency switching using the frequency switching unit. Furthermore, the video signal can be output to the first display unit 120 while recording the images on the memory card 5. That is, the video signal from the image capturing unit 110 can be received, while at the same time, checking the content of the video signal being received.

While the above drive recorders 100, 300, and 310 have been described for the case where the content of the image information recorded on the memory card 5 is checked on the first display unit 120, provisions may also be made to output the image information temporarily stored in the first memory 102 and display it on the first display unit 120 so that the content of the image information can be checked.

Figure 12:
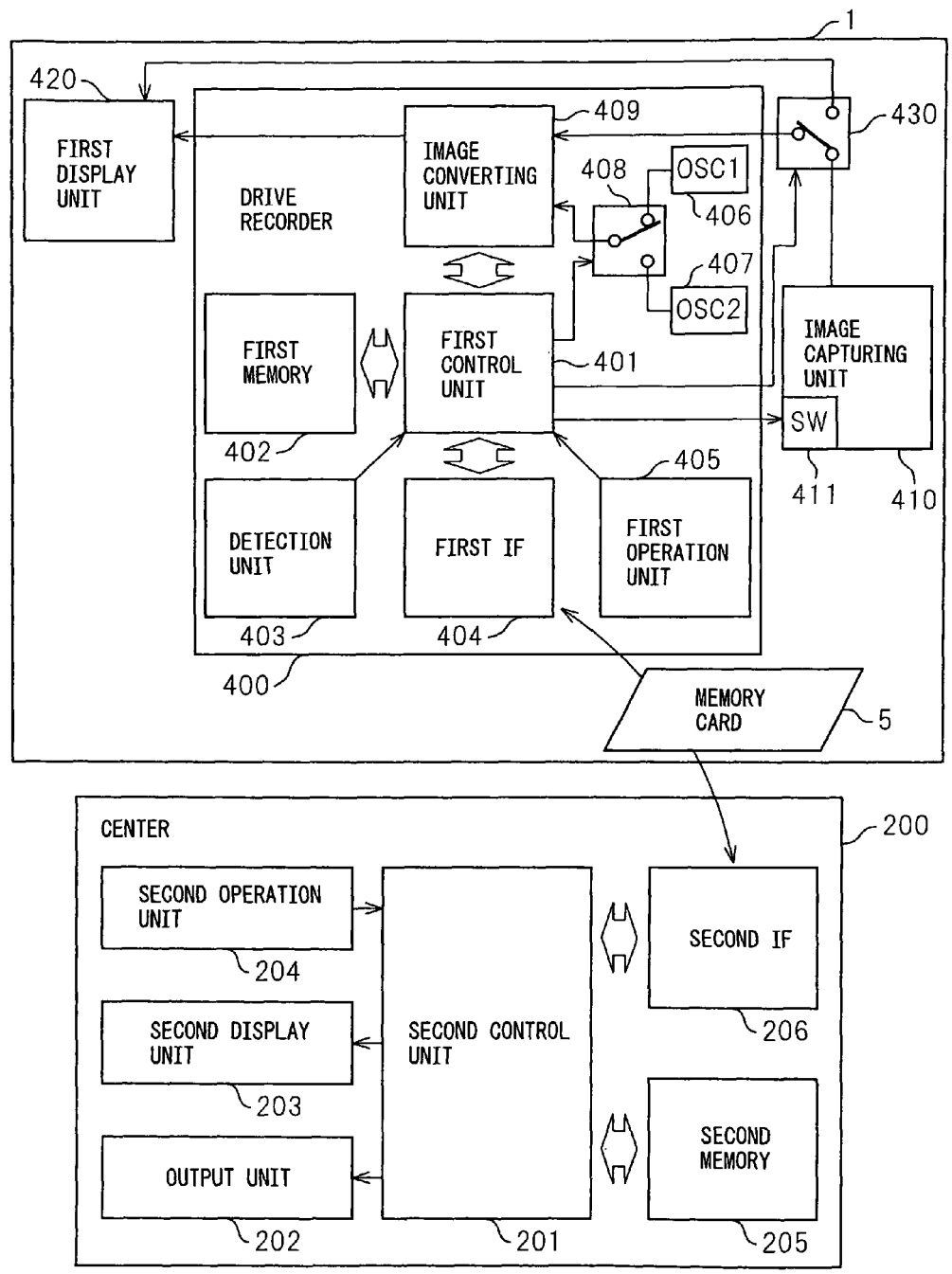
FIG. 12 is a block diagram schematically showing the configuration of a system comprising still another alternative drive recorder.

FIG. 12 is a block diagram schematically showing the configuration of a system comprising still another alternative drive recorder 400.

The drive recorder system includes, in addition to the drive recorder 400 mounted in a vehicle 1, an image capturing unit 410, a first display unit 420 constructed from an LCD monitor or the like that is driven at a frequency corresponding to that of a standard video signal, and a signal switching unit 430 for directing the video signal from the image capturing unit 410 to a selected output. The drive recorder 400 further includes a detachable memory card 5 for saving image information recorded during the occurrence of an event, and the system is constructed so that the images saved on the memory card 5 can be reproduced at the center terminal 200.

The display unit of a navigation system (not shown) mounted in the vehicle 1 may be used as the first display unit 420. Further, the drive recorder 400 may be incorporated into the navigation system containing the first display unit 420. Furthermore, the first display unit 420 may be a test monitor used exclusively for checking the operation of the image capturing unit 410, and may not be permanently mounted. On the other hand, the image capturing unit 410 may be a camera mounted in the vehicle 1 for some other purpose (for example, a rear-view camera or a front-view camera).

The drive recorder 400 includes a first control unit 401 comprising a CPU, ROM, RAM, etc., a first memory 402 for temporarily storing images, a detection unit 403 constructed from a G (acceleration) sensor or the like, a first memory card IF (interface) 404 having a slot into which the memory card 5 is inserted to perform operations such as writing images to the memory card 5, a first operation unit 405 comprising switches, buttons, etc., a first frequency oscillator 406 corresponding to the frequency of the video signal received from the image capturing unit 410, a second frequency oscillator 407 corresponding to the frequency of the video signal to be output to the first display unit 420, a frequency switching unit 408 for switching between the first frequency and the second frequency, and an image converting unit 409 for converting the video signal received from the capturing unit 410 into image information and for outputting the image information as the video signal to the first display unit 420.

The G sensor included in the detection unit 403 detects gravitational acceleration in two axis directions (X axis and Y axis) perpendicular to each other. The G sensor is mounted inside the vehicle so that the direction (positive direction) of the Y axis of the G sensor coincides with the forward direction of the vehicle and the direction (positive direction) of the X axis of the G sensor coincides with the rightward direction of the vehicle. Accordingly, based on the detection signal G (Gx, Gy) output from the G sensor, the first control unit 401 can determine whether an impact has been applied to the vehicle and from which direction the impact has been applied to the vehicle. Gx represents the gravitational acceleration in the X-axis direction, and Gy the gravitational acceleration in the Y-axis direction.

The image capturing unit 410 comprises a CCD camera that captures an image at a frequency not affected by LED traffic light flashing and outputs a video signal based on the thus captured image, and that captures an image at a standard frequency and outputs a video signal based on the thus captured image. The image capturing unit 410 further includes a video signal setting unit 411 for making a setting as to which of the first and second video signals is to be output. The video signal setting unit 411 is configured so that it can be controlled by the first control unit 401 of the drive recorder 400, or operated by the user, to set the video signal to be output from the image capturing unit 410.

In the present system, based on the previously described concept of the frequency not affected by the LED traffic light flashing, the video capture frequency fr of the image capturing unit 410 that is not affected by the LED traffic light flashing is set to 59.5 Hz. According to the previously given equation (3), since the flashing frequency fb is 1 Hz, and the flashing cycle is 1 second, the OFF period is about 0.3 second which is one third of the flashing cycle. Similarly, according to the previously given equation (2), the OFF period is 0.02 second. As a result, every color used in LED traffic lights becomes recognizable in the captured video, whether in eastern Japan or in western Japan.

Accordingly, the first frequency corresponding to the first frequency oscillator 406 is chosen to be 59.5 Hz, and the first frequency oscillator 406 outputs a clock signal having a clock frequency for creating the first frequency. Specifically, to create the first frequency (59.5 Hz), the clock frequency of the first frequency oscillator 406 may be set to 12.182625 MHz (or 13.376785 MHz). The first frequency (59.5 Hz) chosen here is one example, and use may be made of some other frequency that falls within the frequency range not affected by the LED traffic light flashing. Here, if the image were captured at the frequency (59.94 Hz) employed for the NTSC standard video signal, then the traffic light in the image, if captured in western Japan, would repeatedly flash on and off with a flashing cycle of 1/fb (s), i.e., about 8.33 seconds, and the color of the traffic light would become unrecognizable throughout one third of the flashing cycle, i.e., about 2.8 seconds, which would be undesirable (see FIG. 5).

The previously given equations (2) and (3) have been constructed for the case where the frequency not affected by the LED traffic light flashing is determined so that the period throughout which the color of the traffic light becomes unrecognizable is held shorter than the ON period of the yellow LED, i.e., two seconds, and it is to be understood that the range that fr can take varies depending on how the period throughout which the color of the traffic light becomes unrecognizable is determined.

In the image capturing unit 410 according to the present system, the NTSC standard video signal frequency (59.94 Hz) is chosen as the standard frequency. The image capturing unit 410 is constructed to be able to output the first video signal based on the frequency (59.5 Hz) not affected by the LED traffic light flashing or the second video signal based on the standard frequency (59.94 Hz) by selecting one or the other of the signals in accordance with the setting made by the video signal setting unit 411.

The first display unit 420 comprises an LCD monitor which displays the video signal output at the NTSC standard video signal frequency (59.94 Hz).

In view of the above construction of the first display unit 420 and the second video signal corresponding to the standard frequency (59.94 Hz) output from the image capturing unit 410, the second frequency corresponding to the second frequency oscillator 407 is chosen to be 59.94 Hz. Accordingly, the second frequency oscillator 407 outputs a clock signal having a clock frequency for creating the second frequency.

Specifically, to create the second frequency (59.94 Hz), the clock frequency of the second frequency oscillator may be set to 12.272715 MHz (or 13.5 MHz).

The signal switching unit 430 includes a switch which directs the video signal from the image capturing unit 410 to the drive recorder 400 or the first display unit 420, whichever is selected, in accordance with a control signal from the first control unit 401 of the drive recorder 400. The signal switching unit 430 may be incorporated into the drive recorder 400 or into the image capturing unit 410.

The center terminal 200 is the same as that shown in FIG. 7, and therefore, the description thereof will not be repeated here. Further, the memory card 5 used in the system shown here is also the same as the previously described one, and therefore, the description thereof will not be repeated here.

Figure 13:
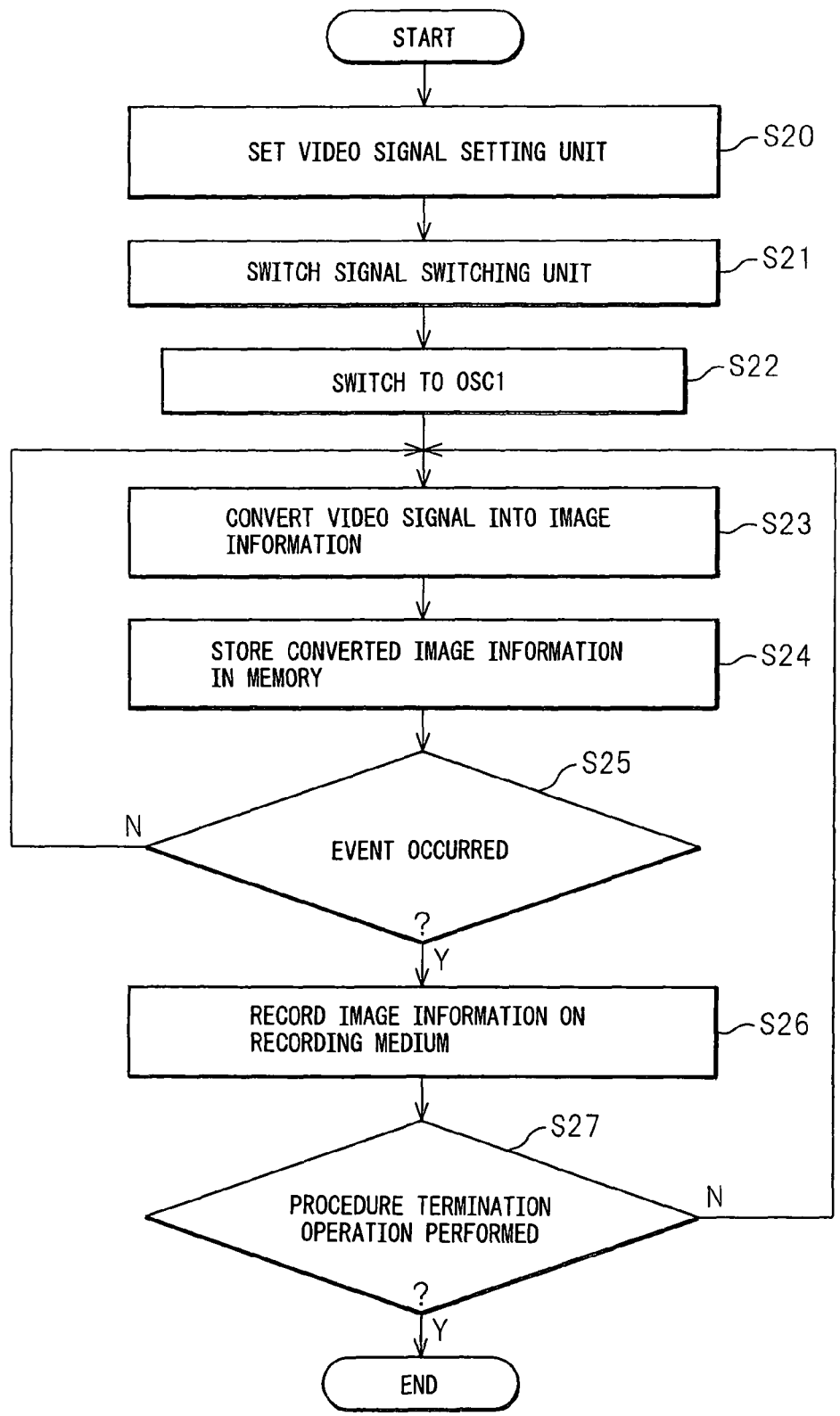
FIG. 13 is a flow diagram illustrating one example of an image information recording procedure.

FIG. 13 is a flow diagram illustrating one example of an image information recording procedure performed by the drive recorder 400.

It is assumed that, before initiating the recording procedure shown in FIG. 13, power is turned on at least to the drive recorder 400, the image capturing unit 410, and the signal switching unit 430, and that the memory card 5 is loaded into the first memory card IF 404. It is also assumed that the recording procedure shown in FIG. 13 is executed with the first control unit 401 controlling each constituent element in accordance with a program prestored in the ROM or the like of the first control unit 401.

When a procedure initiation operation (such as power-on operation or the pressing of a start button) is performed on the first operation unit 405, the first control unit 401 controls the video signal setting unit 411 of the image capturing unit 410 so that the first video signal based on the frequency (59.5 Hz) not affected by the LED traffic light flashing is output from the image capturing unit 410 (S20).

Next, the first control unit 401 controls the signal switching unit 430 so that the first video signal from the image capturing unit 410 is supplied to the drive recorder 400 (S21).

Next, the first control unit 401 switches the frequency switching unit 408 to select the clock frequency from the first frequency oscillator 406 so that the image converting unit 409 is driven at the clock frequency selected to create the first frequency (59.5 Hz) (S22).

The image converting unit 409 receives from the image capturing unit 410 the video signal corresponding to the first frequency, and converts it into image information (S23). In the flow shown here, 30 frames of images per second are created from the first video signal received from the image capturing unit 410.

The first control unit 401 performs control so that the images thus converted by the image converting unit 409 are recorded in the first memory 402 in a continuously circulating manner, i.e., in an endless manner (S24). The system is constructed so that the image information equivalent, for example, to 60 seconds of converted images (1800 frames of images) is always held in the first memory 402.

Next, the first control unit 401 checks whether or not an event has occurred (S25). For example, when the G sensor of the detection unit 403 has detected gravitational acceleration greater than a predetermined threshold value, it can be determined that an event has occurred because an impact has been applied to the vehicle equipped with the drive recorder. Further, when a specific switch contained in the first operation unit 405 is turned on, it may be determined that an event has occurred by determining that a specific event for which the user wants to record images has occurred.

If it is determined in S25 that no event has occurred, steps S23 and S24 are repeated to continue to record the images in the first memory 402 in a continuously circulating manner.

If it is determined in S25 that an event has occurred, the first control unit 401 performs control so that 12 seconds of images (360 frames of images) recorded before the occurrence of the event and 8 seconds of images (240 frames of images) recorded after the occurrence of the event are recorded as image information for one event onto the memory card 5 (S26).

The first control unit 401 checks whether a procedure termination operation (such as power-off operation or the pressing of an end button) has been performed on the first operation unit 405 (S27), and if such a procedure termination operation has been performed, the image information recording procedure is terminated; otherwise, the process returns to step S23 to repeat the process from step S23 to step S27.

In this way, the drive recorder 400 operates so that the images that the image converting unit operating at the first frequency outputs by converting the first video signal received from the image capturing unit 410 are stored in the first memory 402 in a continuously circulating manner until an event occurs, and the images thus stored are recorded on the memory card 5 only when an event has occurred.

The image information recorded on the memory card 5 in accordance with the recording procedure shown in FIG. 13 can be checked on the second display unit 203 by loading the memory card 5 into the second memory card IF 206 of the center terminal 200.

Figure 14:
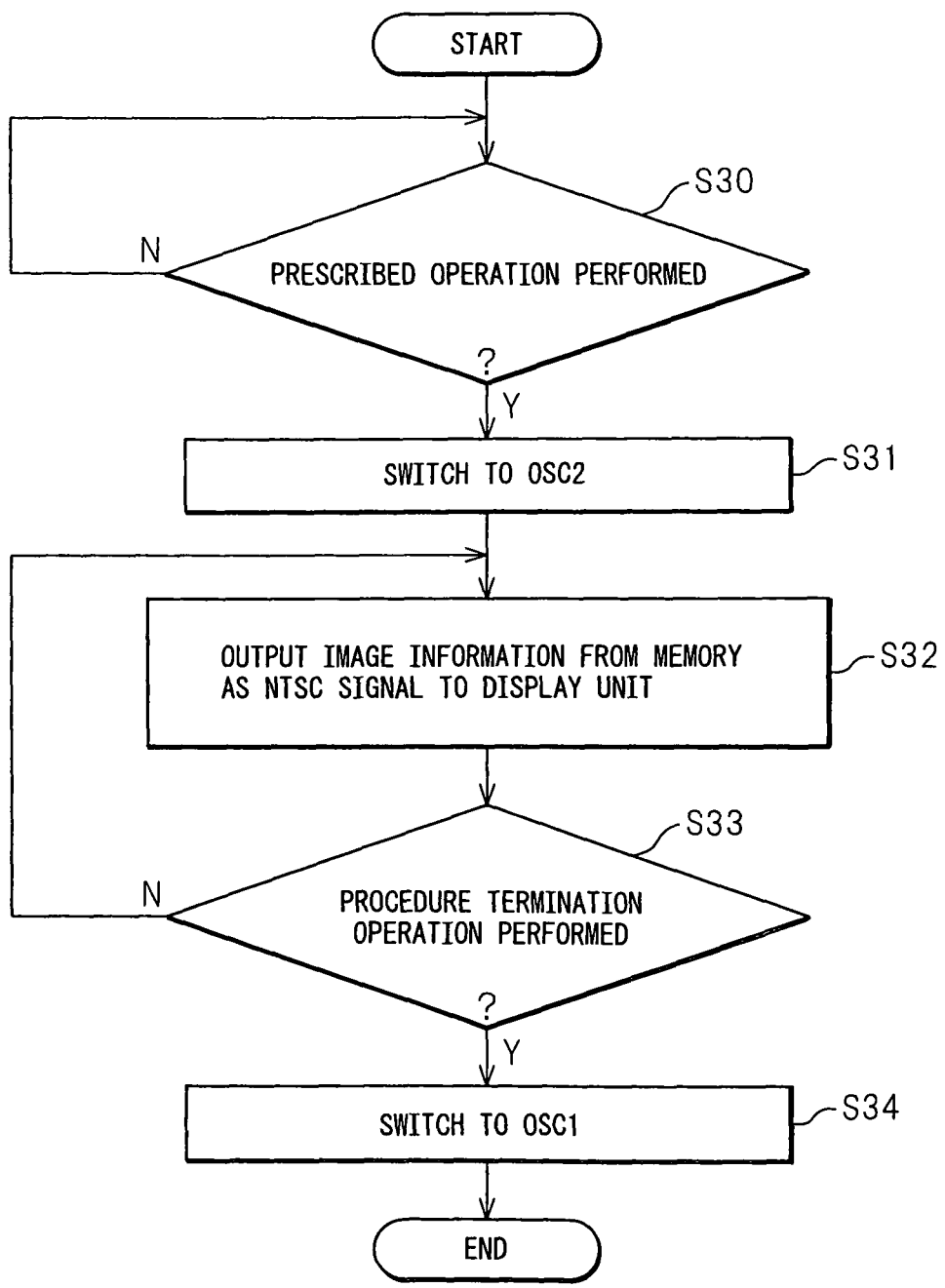
FIG. 14 is a flow diagram illustrating one example of an image information checking procedure.

FIG. 14 is a flow diagram illustrating one example of a procedure for checking the image information recorded in the drive recorder 400.

It is assumed that, before initiating the checking procedure shown in FIG. 14, power is turned on at least to the drive recorder 400 and the display unit 420, and that the memory card 5 is loaded into the first memory card IF 404. It is also assumed that image information for at least one event is recorded on the memory card 5. Further, it is assumed that the checking procedure shown in FIG. 14 is executed with the first control unit 401 controlling each constituent element in accordance with a program prestored in the ROM or the like of the first control unit 401.

First, the first control unit 401 checks whether a prescribed operation (such as operation of a designated switch on the first operation unit 405 or special operation (pressing and holding) of a specific switch) has been performed for initiating the image information checking procedure (S30).

If, in S30, the prescribed operation has been performed on the first operation unit 405, the first control unit 401 switches the frequency switching unit 408 to select the clock frequency from the second frequency oscillator 407 so that the image converting unit 409 is driven at the clock frequency selected to create the second frequency (59.94 Hz, the NTSC standard video signal frequency) (S31).

Next, the first control unit 401 performs control so that the image information recorded on the memory card 5 is converted by the image converting unit 409 and output as a video signal corresponding to the second frequency to the first display unit 420 (S32). It is preferable to perform control so that the image information is sequentially output from the memory card 5 starting with the most recently recorded information.

Next, the first control unit 401 checks whether a procedure termination operation (such as power-off operation or the pressing of an end button) for terminating the image information checking procedure has been performed on the first operation unit 405 (S33); if such a procedure termination operation has not been performed yet, the process returns to S32 to continue to output the video signal to the first display unit 420.

If such a procedure termination operation has been performed in S33, the first control unit 401 switches the frequency switching unit 408 so that the image converting unit 409 is driven by using as the driving frequency the clock frequency corresponding to the first frequency (59.5 Hz) output from the first frequency oscillator 406 (S34). That is, the sequence of image information checking operations is terminated after setting the system back to the state ready to initiate the image information recording procedure shown in FIG. 13.

In the prior art, if a conventional camera is used that operates at the NTSC standard video signal frequency, the recorded information can be readily checked on the conventional display unit 420 that is driven at the NTSC standard video signal frequency (59.94 Hz); however, there has been the problem that, in western Japan, the images thus recorded are affected by the LED traffic light flashing and, if, on the other hand, an image capturing unit is used that captures images at the first frequency (59.5 Hz) not affected by the LED traffic light flashing, the recorded image information cannot be readily checked. By contrast, in the drive recorder 400 according to the present embodiment, as described above, the image information recorded by receiving the video signal from the image capturing unit 410 that captures images at the first frequency (59.5 Hz) not affected by the LED traffic light flashing can be displayed on the conventional display unit 420 that is driven at the NTSC standard video signal frequency (59.94 Hz). In this way, the image information recorded on the memory card 5 can be readily checked on the conventional display monitor by using the image capturing unit 410 that captures images at the first frequency (59.5 Hz) not affected by the LED traffic light flashing and the conventional display unit 420 that is driven at the NTSC standard video signal frequency (59.94 Hz).

Figure 15:
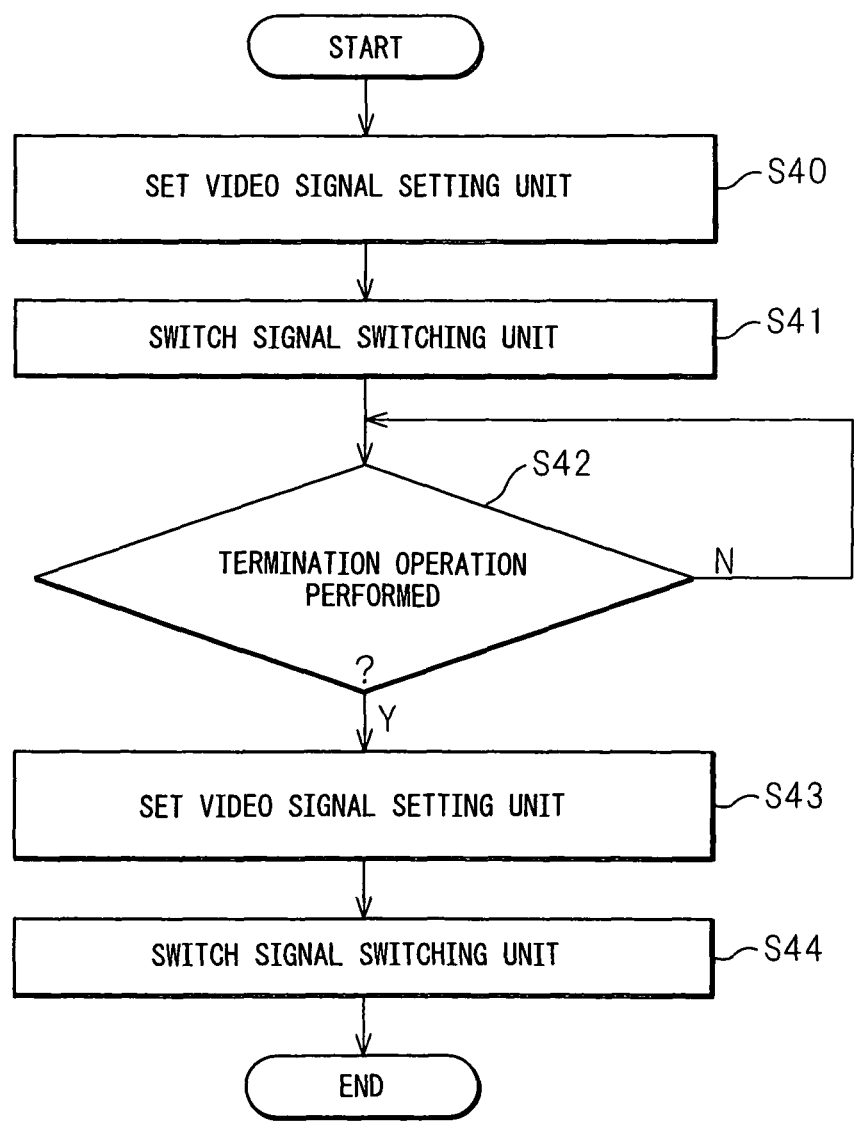
FIG. 15 is a flow diagram illustrating one example of a procedure for checking the operation of an image capturing unit.

FIG. 15 is a flow diagram illustrating one example of a procedure for checking the operation of the image capturing unit 410.

It is assumed that, before initiating the operation checking procedure shown in FIG. 15, power is turned on at least to the drive recorder 400, the image capturing unit 410, the display unit 420, and the signal switching unit 430. It is also assumed that the operation checking procedure shown in FIG. 15 is executed with the first control unit 401 controlling each constituent element in accordance with a program prestored in the ROM or the like of the first control unit 401.

First, when an operation for initiating the operation checking procedure (such as the pressing of an operation checking start button) is performed on the first operation unit 405, the first control unit 401 controls the video signal setting unit 411 of the image capturing unit 410 so that the second video signal based on the standard frequency (59.94 Hz) is output from the image capturing unit 410 (S40).

Next, the first control unit 401 controls the signal switching unit 430 so that the second video signal from the image capturing unit 410 is supplied directly to the first display unit 420 (S41).

The first control unit 401 checks whether an operation for terminating the operation checking procedure (such as the pressing of an operation checking end button) has been performed on the first operation unit 405 (S42); if such an operation has been performed, the first control unit 401 controls the video signal setting unit 411 of the image capturing unit 410 to return to the initial setting so that the first video signal is output from the image capturing unit 410 (S43). After that, the first control unit 401 controls the signal switching unit 430 so that the first video signal from the image capturing unit 410 is supplied to the image converting unit 409 (S44), and thus terminates the procedure.

In this way, when checking the operation of the image capturing unit, since control is performed so that the second video signal based on the standard frequency (59.94 Hz) is output from the image capturing unit 410 and is directed to the first display unit 420, the video signal from the image capturing unit 410 can be directly displayed on the first display unit 420. The checking of the operation of the image capturing unit 410 can thus be accomplished in a simple manner.

Figure 16:
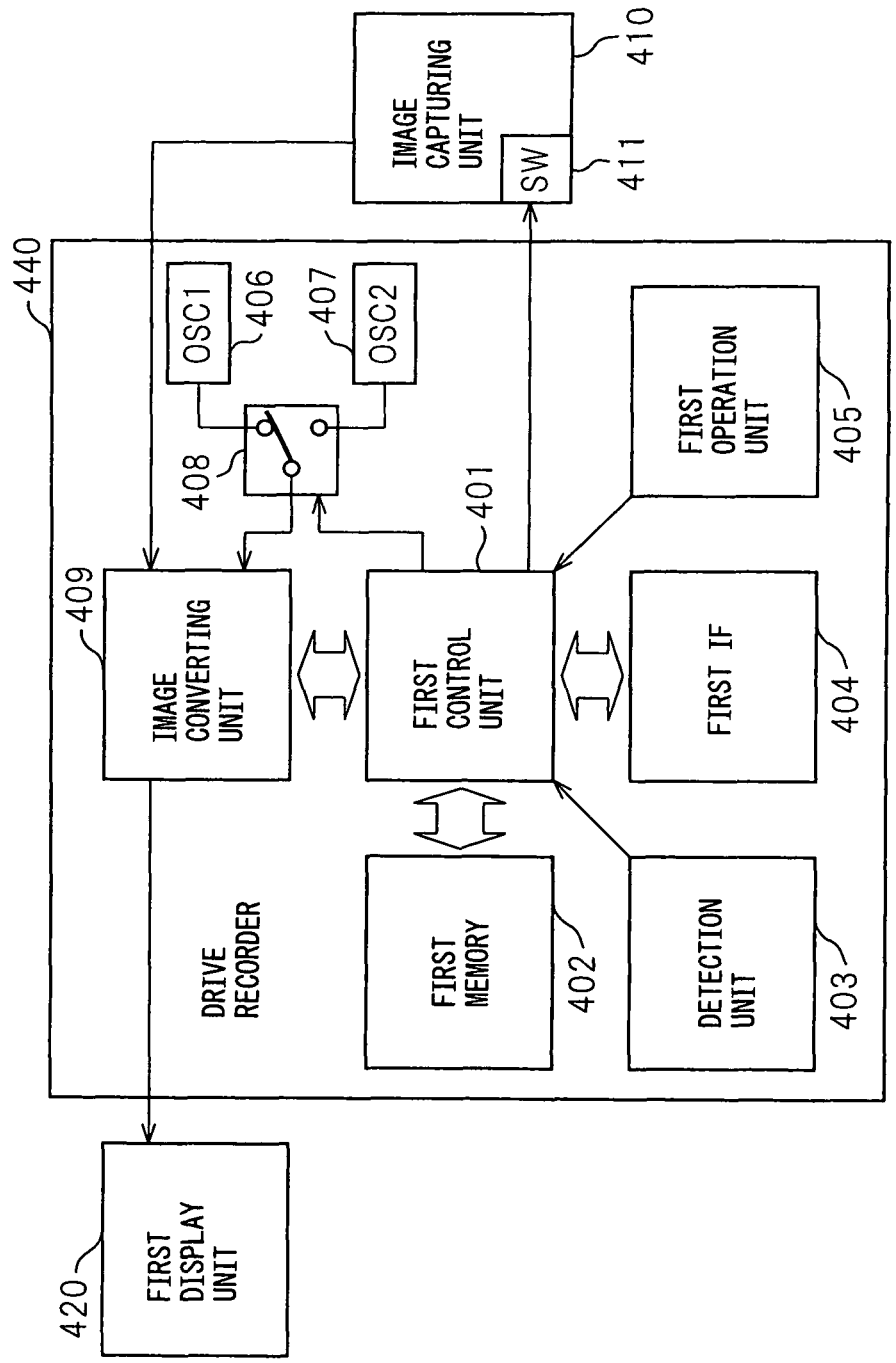
FIG. 16 is a block diagram schematically showing the configuration of a system comprising yet another alternative drive recorder.

FIG. 16 is a block diagram schematically showing the configuration of a system comprising yet another alternative drive recorder 440.

In FIG. 16, the same components as those in the drive recorder system shown in FIG. 12 are designated by the same reference numerals. Further, in FIG. 16, the memory card 5 and the center terminal 200 are not shown. The only difference between the drive recorder system shown in FIG. 16 and the drive recorder system shown in FIG. 12 is that the signal switching unit 430 is eliminated in FIG. 16.

In the drive recorder system shown in FIG. 16, all the video signals output from the image capturing unit 410 are directed to the drive recorder 440. However, when checking the operation of the image capturing unit 410, the control unit 401 performs control so that the second video signal based on the standard frequency (59.94 Hz) is output from the image capturing unit 410, as in S40 of FIG. 15. Further, the control unit 401 switches the frequency switching unit 408 to select the clock frequency from the second frequency oscillator 407 so that the image converting unit 409 is driven at the clock frequency selected to create the second frequency (59.94 Hz, the NTSC standard video signal frequency), as in S31 of FIG. 14. Furthermore, the control unit 401 controls the image converting unit 409 so that the second video signal from the image capturing unit 410 is supplied directly to the first display unit 420. That is, in the drive recorder system shown in FIG. 16, the image converting unit 409 also functions as a substitute for the signal switching unit 430 that performs video signal switching.

In the drive recorder system of FIG. 16 also, when checking the operation of the image capturing unit, control is performed so that the second video signal based on the standard frequency (59.94 Hz) is output from the image capturing unit 410 and is directed to the first display unit 420 via the image converting unit 409. Accordingly, the video signal from the image capturing unit 410 can be directly displayed on the first display unit 420. The checking of the operation of the image capturing unit 410 can thus be accomplished in a simple manner.

Figure 17:
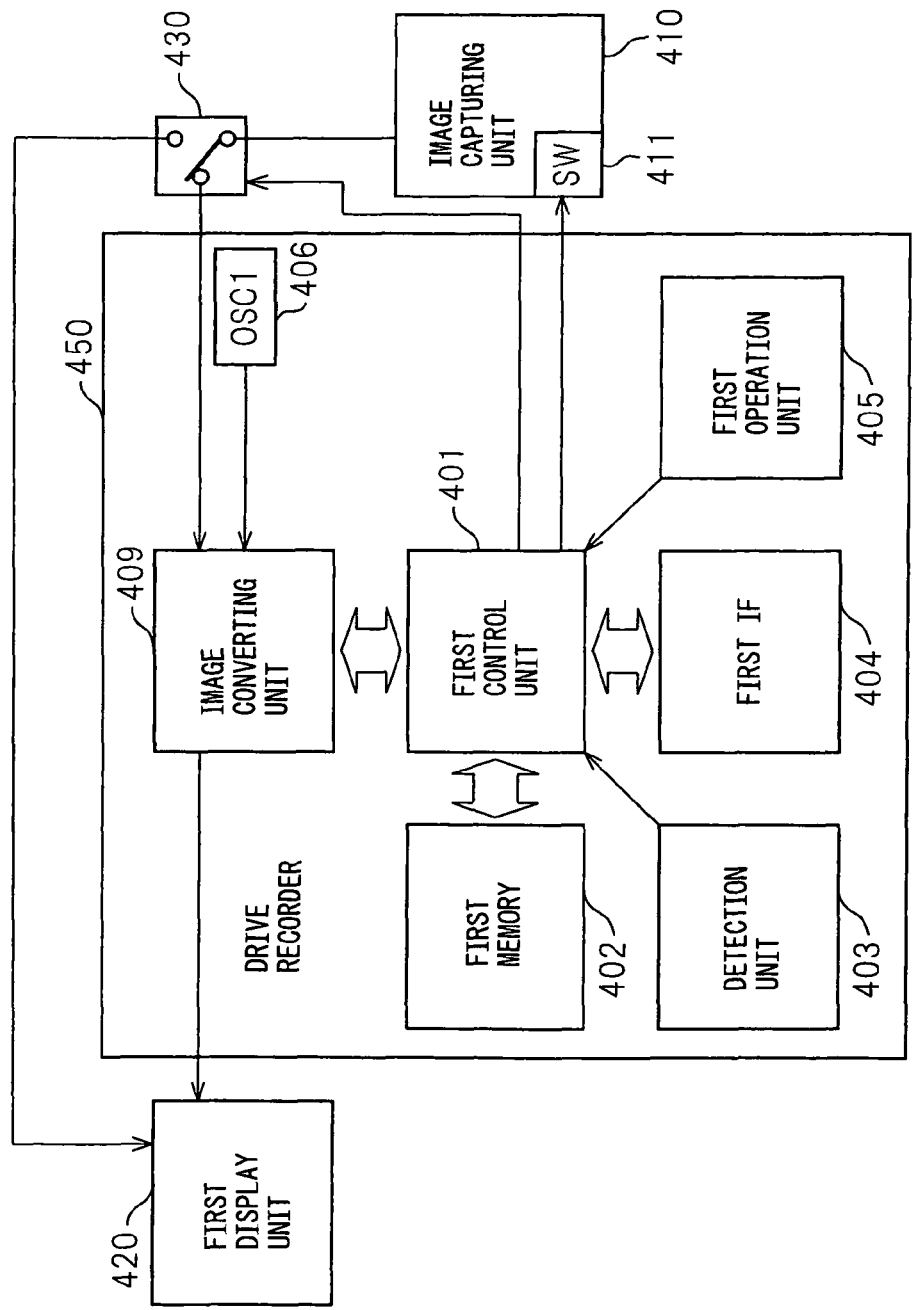
FIG. 17 is a block diagram schematically showing the configuration of a system comprising a further alternative drive recorder.

FIG. 17 is a block diagram schematically showing the configuration of a system comprising a further alternative drive recorder 450.

In FIG. 17, the same components as those in the drive recorder system shown in FIG. 12 are designated by the same reference numerals. Further, in FIG. 17, the memory card 5 and the center terminal 200 are not shown. The only difference between the drive recorder system shown in FIG. 17 and the drive recorder system shown in FIG. 12 is that the second frequency oscillator 407 and the frequency switching unit 408 are eliminated in FIG. 17.

In the drive recorder system shown in FIG. 17, only the first video signal corresponding to the frequency (59.5 Hz) not affected by the LED traffic light flashing is output from the image capturing unit 410 to the drive recorder 450. The system is also configured so that the image information recorded on the memory card 5 is not displayed on the first display unit 420 but can only be checked at the center terminal 200. Accordingly, neither the second frequency oscillator 407 corresponding to the standard frequency (59.94 Hz) nor the frequency switching unit 408 is needed in the drive recorder 450.

In the drive recorder system of FIG. 17 also, when checking the operation of the image capturing unit 410, since control is performed so that the second video signal based on the standard frequency (59.94 Hz) is output from the image capturing unit 410 and is directed to the first display unit 420 via the signal switching unit 430, the video signal from the image capturing unit 410 can be directly displayed on the first display unit 420. The checking of the operation of the image capturing unit 410 can thus be accomplished in a simple manner. The procedure for checking the operation of the image capturing unit 410 is the same as that shown in FIG. 15.

Figure 18:
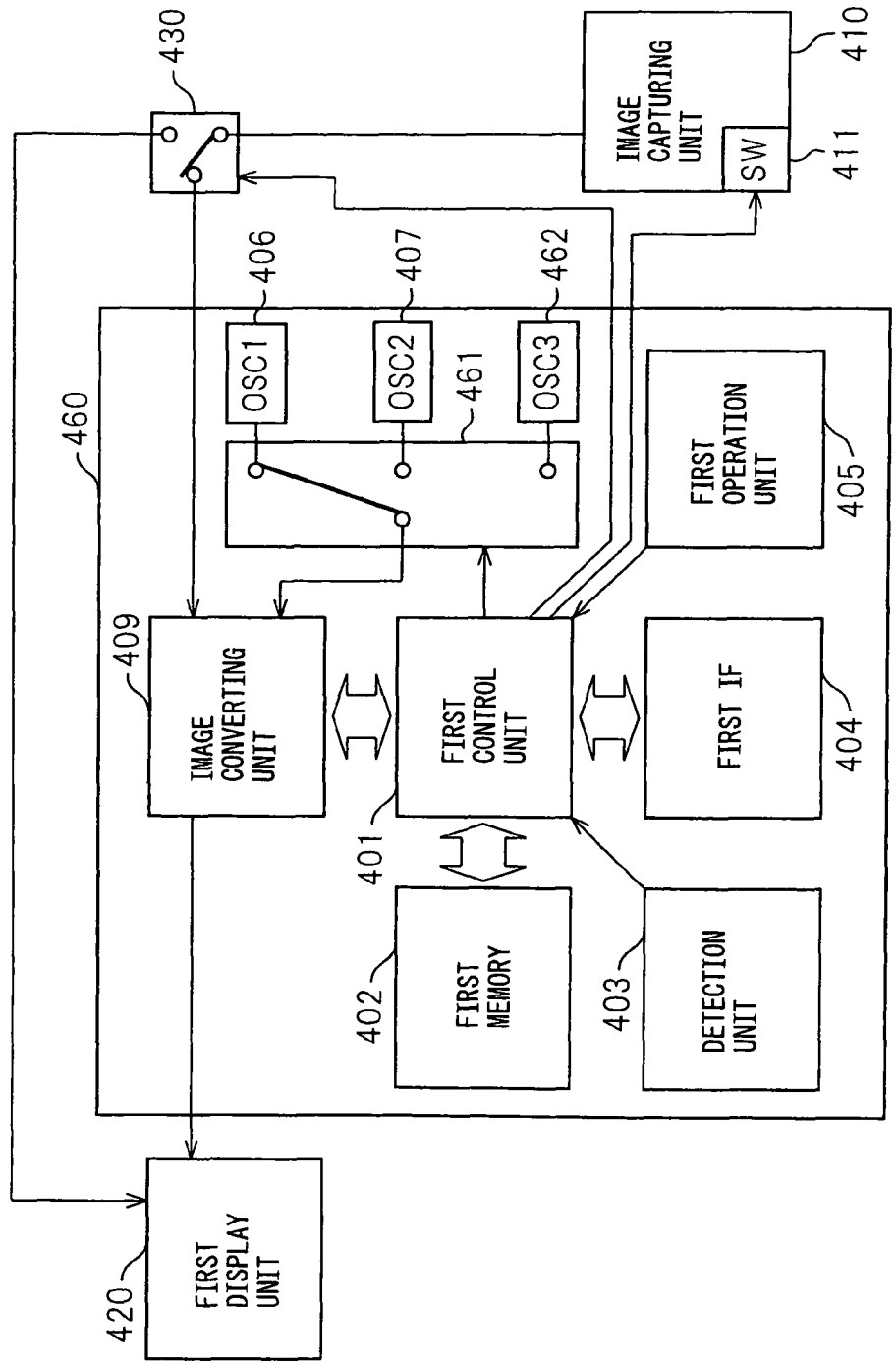
FIG. 18 is a block diagram schematically showing the configuration of a system comprising a still further alternative drive recorder.

FIG. 18 is a block diagram schematically showing the configuration of a system comprising a still further alternative drive recorder 460.

The drive recorder system shown in FIG. 18 is constructed so that the operation of the image capturing unit 410 can be checked at the drive recorder 460 which has a function different from that of the drive recorder 400 constituting the drive recorder system shown in FIG. 12. In FIG. 18, the same components as those in the drive recorder system shown in FIG. 12 are designated by the same reference numerals. Further, in FIG. 18, the memory card 5 and the center terminal 200 are not shown.

The drive recorder 460 shown in FIG. 18 includes a third frequency oscillator 462 and, correspondingly, the frequency switching unit 461 is configured to perform switching so that the frequency of one frequency oscillator selected from among the three frequency oscillators is supplied to the image converting unit 409. Accordingly, when recording the image information on the memory card 5, the image information from the image capturing unit 410 is recorded in accordance with the recording procedure earlier described with reference to FIG. 13.

In the drive recorder 460, the first frequency oscillator 406 outputs a clock signal having a clock frequency for creating the first frequency 59.9 Hz that is not affected by the LED traffic light flashing, and the second frequency oscillator 407 outputs a clock signal having a clock frequency for creating the second frequency 59.94 Hz employed for the NTSC standard video signal, while the third frequency oscillator 462 outputs a clock signal having a clock frequency for creating a third frequency 50 Hz which is the PAL standard video signal frequency. Specifically, to create the third frequency (50 Hz), the clock frequency of the third frequency oscillator 462 may be set to 14.75 MHz (or 13.5 MHz). Further, it is to be understood that the first control unit 401 is configured to be able to select the desired frequency oscillator by controlling the frequency switching unit 461 in accordance with a prescribed operation from the first operation unit 405.

The third frequency oscillator 462 is added to provide for the case where not the onboard monitor or the like, but a display unit dedicated to image information checking, in particular, a monitor that is driven with a clock frequency corresponding to the PAL standard video signal frequency (50 Hz) employed in some overseas countries, is used as the first display unit 420.

Accordingly, in the drive recorder 460 shown in FIG. 18, whatever video standard is employed for the first display unit 420 connected to it, the image information recorded on the memory card 5 can be readily checked by selecting the second or third frequency, whichever is appropriate, by operating the first operation unit 105. If it is desired to support some other video frequency standard in addition to the NTSC and PAL standards, a further additional oscillator that outputs a clock signal having a clock frequency for creating a fourth frequency, etc., should be provided, with provisions made to be able to select the appropriate frequency for use.

In the drive recorder system of FIG. 18 also, when checking the operation of the image capturing unit 410, since control is performed so that the second video signal based on the standard frequency (59.94 Hz) is output from the image capturing unit 410 and is directed to the first display unit 420 via the signal switching unit 430, the video signal from the image capturing unit 410 can be directly displayed on the first display unit 420. The checking of the operation of the image capturing unit 410 can thus be accomplished in a simple manner. The procedure for checking the operation of the image capturing unit 410 is the same as that shown in FIG. 15.

In the drive recorder system shown in FIG. 18, the second video signal corresponding to the standard frequency, output from the image capturing unit 410, is supplied directly to the first display unit 420. Accordingly, when the first display unit 420 is constructed by including a monitor designed to be driven at the clock frequency corresponding to the PAL standard video signal frequency (50 Hz), it is preferable that the image capturing unit 410 is also constructed to be able to output the first video signal corresponding to the frequency (59.5 Hz) not affected by the LED traffic light flashing or the third video signal corresponding to the PAL standard video signal frequency (50 Hz) by selecting one or the other of the signals. In that case, in synchronism with the switching operation to select one of the oscillators 406, 407, and 462, the first control unit 401 controls the video signal setting unit 411 so that the video signal that matches the selected frequency is output from the image capturing unit 410.

Figure 19:
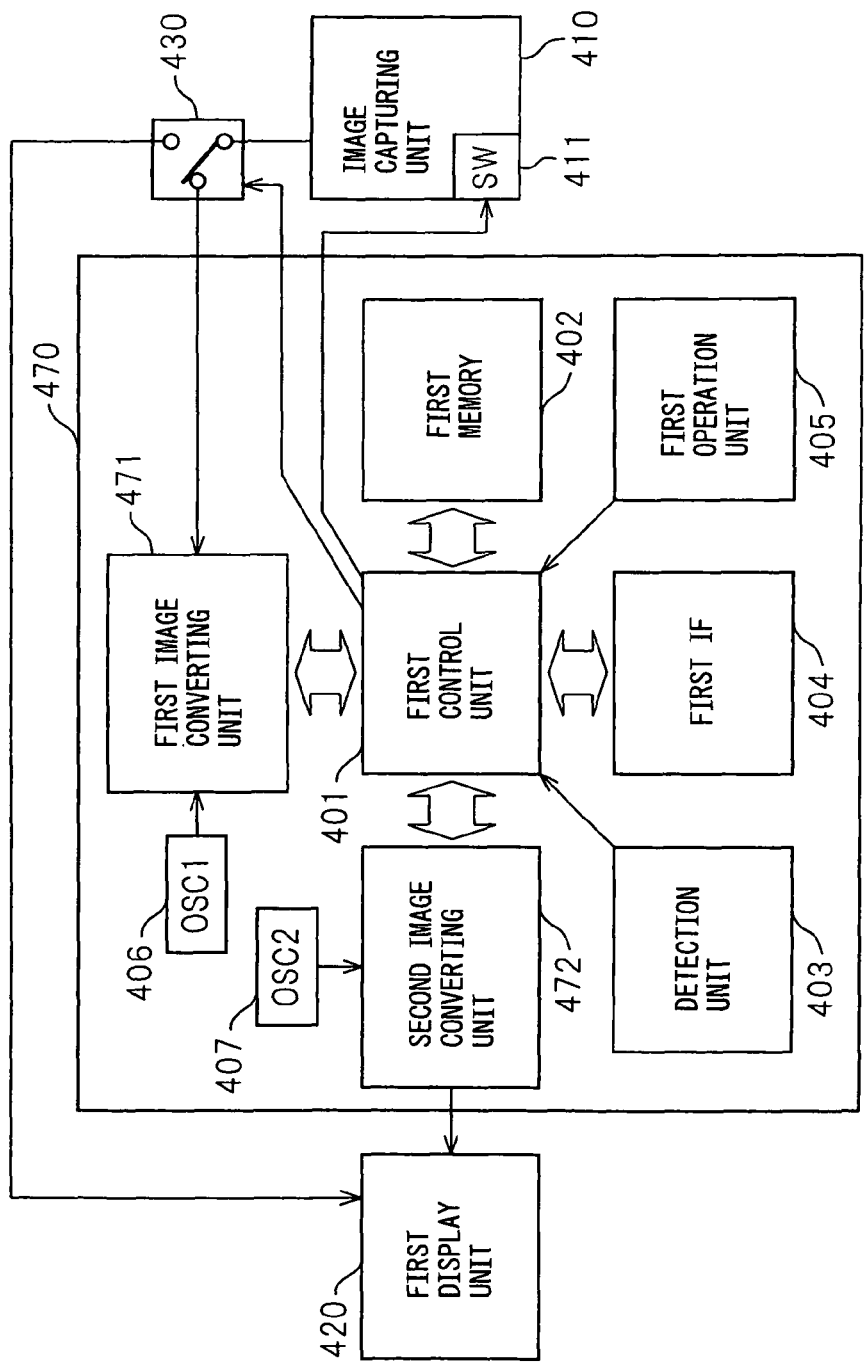
FIG. 19 is a block diagram schematically showing the configuration of a system comprising a yet further alternative drive recorder.

FIG. 19 is a block diagram schematically showing the configuration of a system comprising a yet further alternative drive recorder 470.

The drive recorder system shown in FIG. 19 is constructed so that the operation of the image capturing unit 410 can be checked at the drive recorder 470 which has a function different from that of the drive recorder 400 constituting the drive recorder system shown in FIG. 12. In FIG. 19, the same components as those in the drive recorder system shown in FIG. 12 are designated by the same reference numerals. Further, in FIG. 19, the memory card 5 and the center terminal 200 are not shown.

The drive recorder 470 shown in FIG. 19 includes a first image converting unit 471 directly connected to the first frequency oscillator 406 and a second image converting unit 472 directly connected to the second frequency oscillator 407 so that the image information recorded on the memory card 5 can be checked without having to perform frequency switching using the frequency switching unit.

In the drive recorder 470, when transferring the image information from the image capturing unit 410 for recording on the memory card 5, control is performed so that the first image converting unit 471 converts the first video signal into images by using the clock frequency corresponding to the first frequency (59.5 Hz) not affected by the LED traffic light flashing, and the images thus converted are recorded on the memory card 5. On the other hand, when outputting the video signal to the first display unit 420, control is performed so that the second image converting unit 472 outputs the second video signal to the first display unit 420 by using the clock signal corresponding to the second frequency (59.94 Hz) which is the NTSC standard video signal frequency.

In this way, in the drive recorder 470 shown in FIG. 19, the image information recorded on the memory card 5 can be checked without having to perform frequency switching using the frequency switching unit. Furthermore, the video signal can be output to the first display unit 420 while recording the images on the memory card 5. That is, the video signal from the image capturing unit 410 can be received, while at the same time, checking the content of the video signal being received.

In the drive recorder system of FIG. 19 also, when checking the operation of the image capturing unit 410, since control is performed so that the second video signal based on the standard frequency (59.94 Hz) is output from the image capturing unit 410 and is directed to the first display unit 420 via the signal switching unit 430, the video signal from the image capturing unit 410 can be directly displayed on the first display unit 420. The checking of the operation of the image capturing unit 410 can thus be accomplished in a simple manner. The procedure for checking the operation of the image capturing unit 410 is the same as that shown in FIG. 15. Further, in the drive recorder system shown in FIG. 19, it is effective to output the second video signal to the first display unit 420 via the signal switching unit 430, particularly in such cases where the operation of the drive recorder 470 is not checked yet.

While the above drive recorders 400, 440, 450, 460, and 470 have been described for the case where the content of the image information recorded on the memory card 5 is checked on the first display unit 420, provisions may also be made to output the image information temporarily stored in the first memory 402 and display it on the first display unit 420 so that the content of the image information can be checked.

Figure 20:
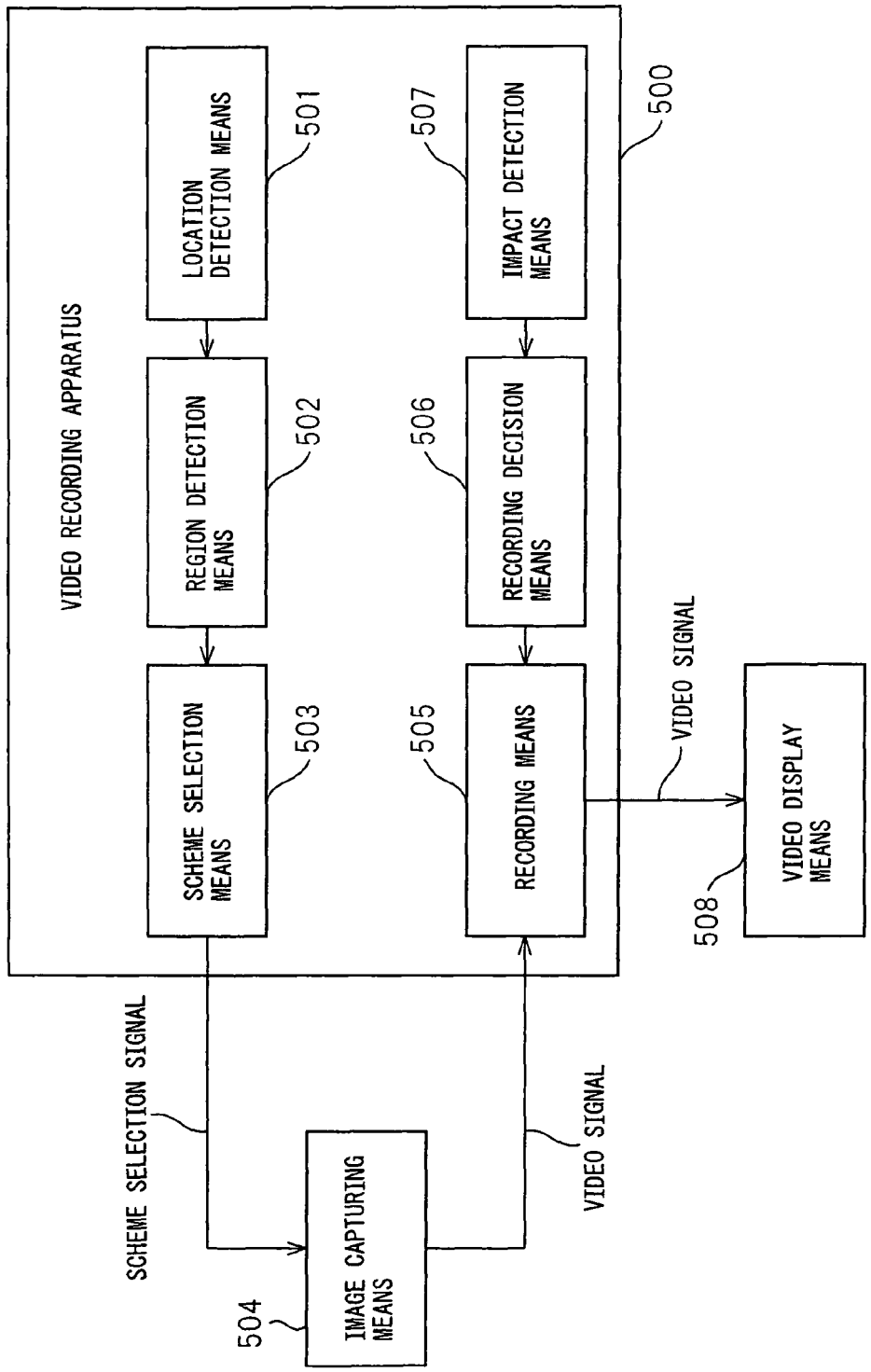
FIG. 20 is a block diagram showing the functional configuration of a vehicle-mounted video recording apparatus.

FIG. 20 is a block diagram showing the functional configuration of a vehicle-mounted video recording apparatus 500.

The video recording apparatus 500, which is mounted in a vehicle, comprises a location detection means 501, a region detection means 502, a scheme selection means 503, a recording means 505, a recording decision means 506, and an impact detection means 507. An image capturing means 504 and a video display means 508 may be integrated into the video recording apparatus 500.

The location detection means 501 detects the location of the vehicle and sends location information to the region detection means 502. When the vehicle location information is received from the location detection means 501, the region detection means 502 detects, based on the vehicle location and prestored region information, the frequency of the commercial power used in the region where the vehicle is located.

The scheme selection means 503 selects a video processing scheme for video capture and video signal generation that matches the frequency of the commercial power thus detected, and supplies a scheme selection signal to the image capturing means 504. The video processing here refers to capturing images and generating the video signal. For example, when the frequency of the commercial power used in the region where the vehicle is located is 50 Hz, the scheme selection means 503 selects the video processing scheme that matches the NTSC standard, and outputs the scheme selection signal so that the video processing will be performed in accordance with the selected scheme. On the other hand, when the frequency of the commercial power used in the region where the vehicle is located is 60 Hz, the scheme selection means 503 selects the video processing scheme that matches the PAL standard, and outputs the scheme selection signal so that the video processing will be performed in accordance with the selected scheme.

The image capturing means 504, which supports a plurality of video processing schemes, captures the view ahead of the vehicle and generates the video signal in accordance with the video processing scheme specified by the scheme selection signal received from the scheme selection means 503, and sends the generated video signal to the recording means 505.

The recording means 505 constantly records the received video signal, and saves the recorded video signal corresponding to a predefined length of time separately in response to a signal supplied from the recording decision means 506. Here, the recording means 505 may record the video signal in the form of an image file.

If it is determined that the magnitude of the impact detected by the impact detection means 507 corresponds to that of an impact comparable to a vehicle accident or the like, the recording decision means 506 sends a signal to the recording means 505 which thereupon initiates the recording control operation.

The video display means 508 receives the video signal recorded by the recording means 505, and displays it as a video image. The user of the video recording apparatus 500 can thus check the video to investigate the situation that occurred ahead of the vehicle, etc.

With the above function, the vehicle-mounted video recording apparatus 500 can record the video using the video processing scheme that matches the region where the vehicle is located. That is, when an image of a traffic signal is captured, even if the traffic signal is an LED-based traffic signal, any traffic light in the traffic signal can be prevented from being shown only in the OFF state in the captured video. Furthermore, at the time of the installation of the camera, the video can be checked immediately on the onboard monitor.

Figure 21:
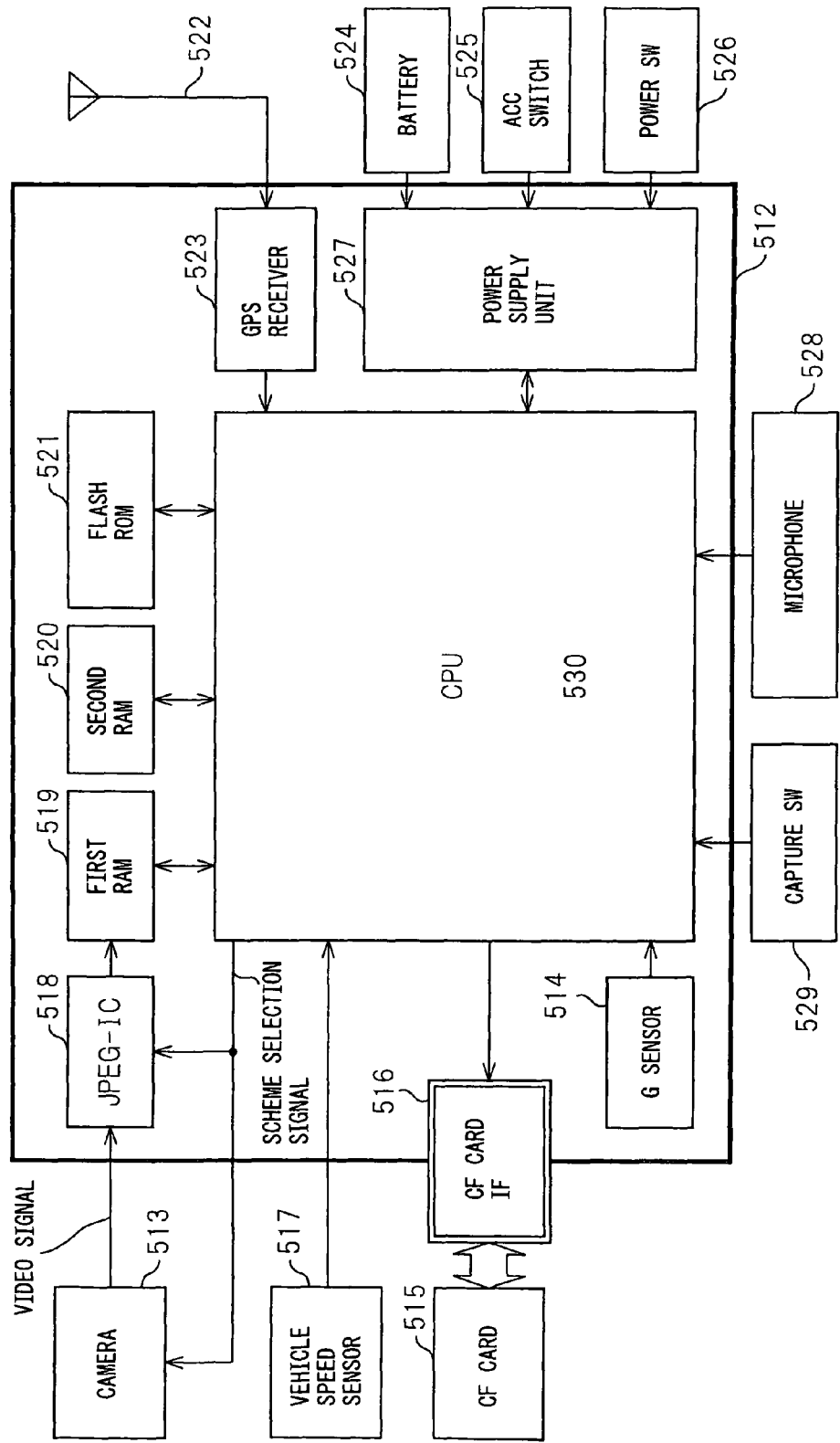
FIG. 21 is a block diagram showing the electrical configuration of the vehicle-mounted video recording apparatus.

FIG. 21 is a block diagram showing the electrical configuration of a drive recorder 512.

The drive recorder 512 here can be constructed as a self-contained vehicle-mounted video recording apparatus, but it may be integrated into a vehicle navigation system or a video camera.

A camera 513 constructed from a CCD (Charge Coupled Device) image sensor is controlled so as to capture the view ahead of the vehicle 1 and output an analog video signal. Such video capture control and the video signal are defined by a video standard, and in the present invention, they conform to the NTSC standard or the PAL standard. The camera 513 is therefore designed to be able to output video signals of both standards. That is, the camera 513 includes programs for processing captured video information conforming to the NTSC standard and the PAL standard, respectively, and controls the video capture and video signal generation by selecting the appropriate program based on the video processing scheme selection signal received from the drive recorder 512. The camera 513 here corresponds to the image capturing means.

A G sensor (Gravity Accelerative Sensor) 514 detects the gravitational acceleration applied to the vehicle 1. The sensor comprises a semiconductor that produces a current when subjected to gravitational acceleration, and detects the magnitudes of the gravitational accelerations in the longitudinal and lateral directions of the vehicle. The G sensor 514 here corresponds to the impact detection means.

A CF (Compact Flash) card 515 is a storage medium removable from the drive recorder 512, and is constructed from a flash memory, a type of nonvolatile semiconductor memory. It is used to record images captured by the camera 513, plus the location and speed (vehicle speed) of the vehicle 1, the gravitation acceleration detected by the G sensor 513, and the time and date, as additional information to accompany the sound picked up by a microphone 528. In the present system, 10 still frames per second, for example, are recorded on the CF card 515, and a maximum of 300 still frames equivalent to 30 seconds of images can be recorded on the CF card 515 for each occurrence of a recording event. The user of the drive recorder 512 can check the driving conditions of the vehicle or the conditions at the time of an accident by displaying the recorded images, etc., on a reproduction apparatus such as a personal computer. The reproduction apparatus such as a personal computer corresponds to the video display means.

The condition that triggers the recording event is, for example, whether the magnitude of the impact applied to the vehicle 1 and detected by the G sensor 514 exceeds a predetermined value or not. That is, the recording condition holds when the gravitational acceleration exceeds 1.0 G continuously for 100 milliseconds, a situation that can be determined as the occurrence of a collision of the vehicle 1. Further, the magnitude of the rate of change of the vehicle speed detected by a vehicle speed sensor 517 may be set as the recording condition. This is because, when rapid deceleration or rapid acceleration of the vehicle 1 is detected, the situation can be determined as being the occurrence of an accident or the imminence of an accident.

In the present system, the CF card 515 is used as the removable storage medium, but alternatively, use may be made of other removable memory card, hard disk, or the like. Further, instead of the CF card 515, use may be made of a hard disk built into the drive recorder 512; in that case, a transmitter circuit should be provided in the drive recorder 512 so that the video data recorded on the hard disk can be transmitted to the reproduction apparatus by means of wireless communications.

A CF card interface (hereinafter called the "CF card IF") 516 constitutes a slot provided in the drive recorder 512 for insertion of the CF card 515. With the CF card 515 inserted in the CF card IF 516, the video information, etc. from the drive recorder 512 is recorded on it.

The vehicle speed sensor 517 is constructed from a magnetic sensor or optical sensor which converts the rotation of the rotor mounted on the driveshaft of the vehicle 1 into a pulse signal for output. A CPU 530 computes the speed of the vehicle 1 by calculating the number of revolutions of the driveshaft per unit time from the pulse signal received from the vehicle speed sensor 517.

A JPEG-IC (JPEG: Joint Photographic coding Experts Group, IC: Integrated Circuit) 518 contains NTSC and PAL video processing circuits, and selects one or the other of the video processing circuits in accordance with the video processing scheme selection signal supplied from the CPU 530. Using the selected video processing circuit, the video signal supplied from the camera 513 is converted into a digital signal and then into JPEG format data. The thus converted data is supplied to a first RAM 519 as will be described hereinafter.

When an NTSC video signal is received, the JPEG-IC 518 converts the video signal into the JPEG format, and writes 30 frames per second to the first RAM 519, the data being overwritten on a frame-by-frame basis. The reason for overwriting on a frame-by-frame basis is that the capacity of the first RAM 519 is limited and also that the JPEG-IC 518 does not have the function of outputting the data by specifying the address. In the case of a PAL video signal, 25 frames per second are written in a similar manner.

The first RAM (Random Access Memory) 519 temporarily stores the video data converted by the JPEG-IC 518 into the JPEG format. The first RAM 519 is connected to a DMA (Direct Memory Access) circuit contained in the CPU 530, and one in every three input video frames is transferred by the DMA function to a second RAM 520 where the video data is stored in an endless manner. In the case of images captured based on the NTSC standard, one frame is stored at about every 100 ms intervals into the second RAM 520, but this does not present a problem when investigating the driving conditions of the vehicle 1, and the capacity of the CF card 515 can be correspondingly saved. In this case, to store several tens of seconds of images on the CF card 515, a capacity of 128 to 256 megabytes will suffice.

The second RAM 520 stores in an endless manner the video information converted by the JPEG-IC 518 into the JPEG format, the sound information from the microphone 528, and the vehicle operational information including the location of the vehicle 1 and time and date measured based on the radio signal received by a GPS receiver 523, the vehicle speed detected by the vehicle speed sensor 517, and the gravitational acceleration detected by the G sensor 514.

It is desirable to use SDRAMs (Synchronous Dynamic Random Access Memories) as the first and second RAMs 519 and 520. Since the SDRAM is designed to operate synchronously with the CPU clock, the SDRAM has short input/output latency, achieves higher access speeds than the conventional DRAM (Dynamic Random Access Memory), and thus lends itself to control of processing when processing a large amount of video data at high speed.

Figure 2:
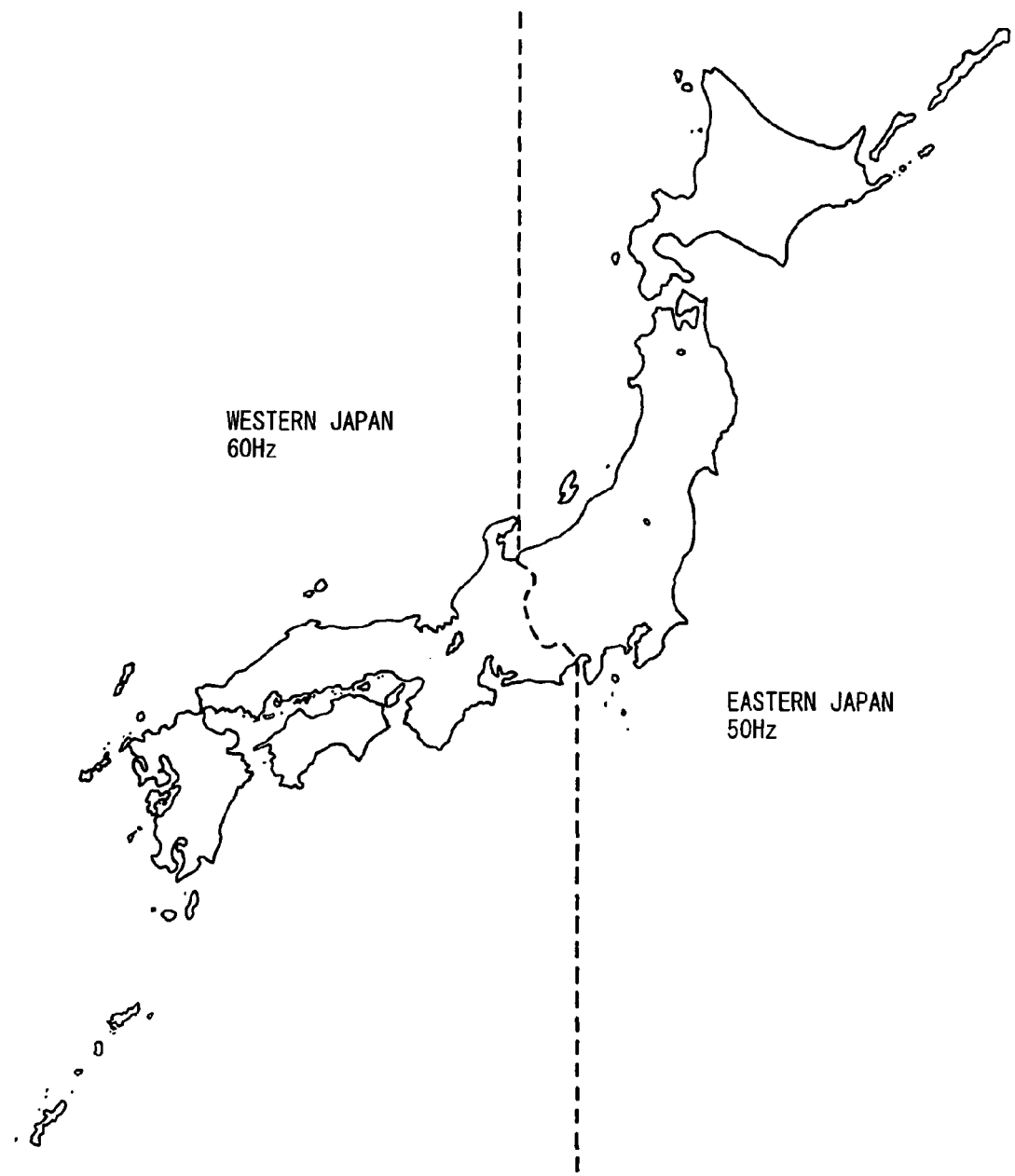
FIG. 2 is a diagram showing the east-west boundary across which the frequency of the commercial power changes.
Figure 3A:
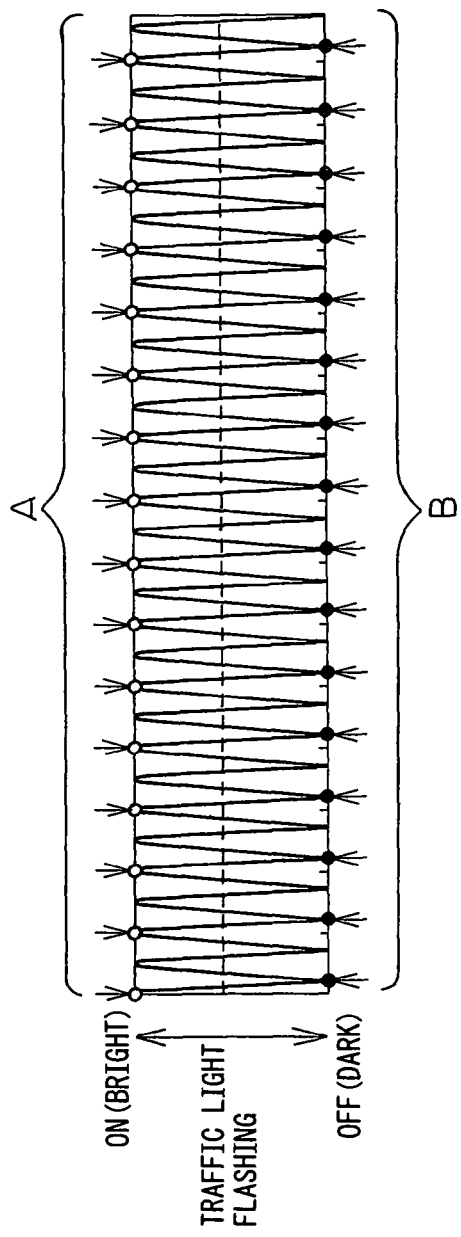
FIG. 3(a) is a diagram showing a first relationship between LED traffic light flashing and video capture timing.
Figure 3B:
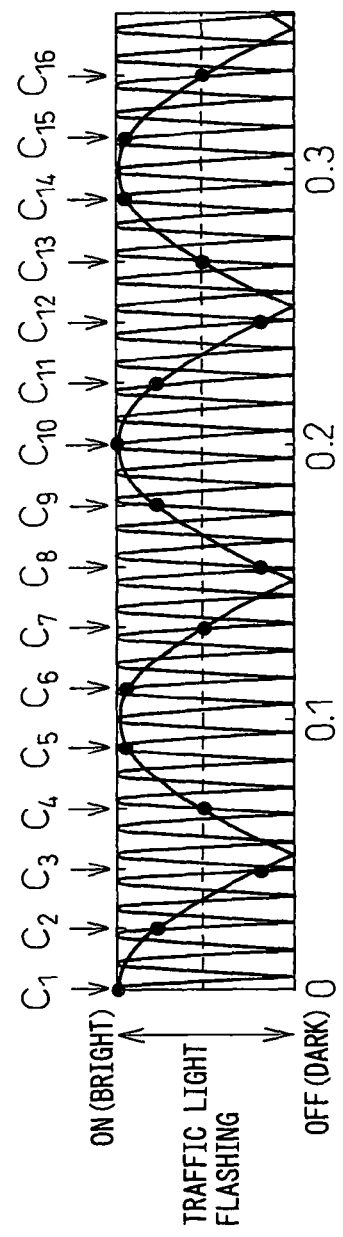
FIG. 3(b) is a diagram showing a second relationship between LED traffic light flashing and video capture timing.

A flash ROM (Flash Read Only Memory) 521 stores a control program for centrally controlling the hardware resources constituting the drive recorder 512. It also stores map information as well as the region information defining the boundary between eastern Japan and western Japan such as shown in FIG. 2. More specifically, the boundary across which the frequency of the commercial power changes from 50 Hz to 60 Hz and vice versa is stored in the form of latitude/longitude information. If the vehicle location in latitude and longitude received by the GPS receiver 523 is west of the boundary, then it can be determined that the vehicle is located in western Japan. Alternatively, map information that can be used to search for a place name in terms of latitude and longitude and to identify the frequency of the commercial power used in the geographical area associated with that place name may be stored on the flash ROM 521.

A GPS (Global Positioning System) antenna 522 transmits radiowaves to a plurality of GPS satellites not shown, and receives the reflected radiowaves. The received radiowaves carry the time/date information and the location information representing the location of the vehicle 1 by latitude and longitude.

The GPS receiver 523 receives the radiowave signals from the GPS satellites via the GPS antenna 522, and supplies the received radiowave signals to the CPU 530. Based on the radiowave signals supplied from the GPS receiver 523, the CPU 530 computes the time/date information and the location information representing the location of the vehicle 1 by latitude and longitude.

A battery 524 is mounted in the vehicle 1, and supplies power to the drive recorder 522 proper. Any battery can be used as long as it can be mounted in the vehicle 1 and can produce an electromotive force of 12 V.

An accessory switch (hereinafter called the "ACC switch") 525 is provided in an electrically integral fashion with the engine starting key cylinder of the vehicle 1. When the switch is turned on by the user operating the key, an ON signal is sent to the drive recorder 512. The drive recorder 512 initiates control upon receiving the ON signal from the ACC switch 525.

A power switch (hereinafter called the "power SW") 526 sends an ON signal to the drive recorder 512 when the power SW is operated by the user. This switch can be used when it is desired to operate the drive recorder 512 without turning on the ACC switch 525.

A power supply unit 527 is connected to the CPU 530 and, upon receiving the ON signal from the ACC switch 525, supplies the power from the battery 524 to the CPU 530 and the various parts of the drive recorder 512. Further, when the turning on of the power SW 526 is detected, the power supply unit 527 starts to supply power, irrespective of the state of the ACC switch 525. When the turning off of the ACC switch 525 or the power SW 526 is detected, the power supply unit 527 sends an end signal to the CPU 530. The CPU 530 that received the end signal sends an OFF signal to the power supply unit 527 to terminate the control process. Thereupon, the power supply unit 527 stops the supply of power.

The microphone 528 is electrically connected to the CPU 530, and is configured to pick up sound inside or outside the vehicle 1 and send the sound to the CPU 530. It is preferable to use a unidirectional microphone whose sensitivity is the highest in the forward direction of the microphone so as not to unnecessarily pick up noise from the road.

A capture switch (hereinafter called the "capture SW") 529, when operated by the user, sends a signal to the CPU 530 electrically connected to it. Thereupon, the CPU 530 performs control so that the video information, etc. stored in the second RAM 520 are recorded on the CF card 515. That is, the operation of the capture SW 529 serves as the condition that triggers the recording event. Only the video information at the moment the capture SW 529 is operated may be recorded on the CF card 515.

The CPU (Central Processing Unit) 530 is responsible for the control of the drive recorder 512 and is constructed from a microcomputer or the like. The CPU 530 performs control so that the video information stored in the first RAM 519, the sound information from the microphone 528, and the vehicle operational information including the location information of the vehicle and time/date information detected from the GPS receiver 523, the vehicle speed detected by the vehicle speed sensor 517, and the gravitational acceleration detected by the G sensor 514, are stored periodically in the second RAM 520 in an endless manner. Then, when the occurrence of the recording condition is detected, the operational information, video information, and sound information recorded for 15 seconds before and after the occurrence of the recording event, i.e., a total of 30 seconds, are transferred from the second RAM 520 to the CF card 515 for recording.

Further, based on the location information supplied from the GPS receiver 523, the CPU 530 performs control so that the standardized video processing scheme not affected by the LED traffic light flashing is selected as the video processing scheme for the camera 513 and the JPEG-IC 518. That is, when the vehicle is located in eastern Japan where the frequency of the commercial power is 50 Hz, the scheme selection signal for selecting the NTSC video processing scheme is sent to the camera 513 and the JPEG-IC 518. On the other hand, when the vehicle is located in western Japan where the frequency of the commercial power is 60 Hz, the scheme selection signal for selecting the PAL video processing scheme is sent to the camera 513 and the JPEG-IC 518.

The CPU 530 corresponds to the location detection means, region detection means, scheme selection means, recording means, and recording decision means according to the present invention. The GPS receiver 523 or the combination of the GPS receiver 523 and GPS antenna 522 may be made to correspond to the location detection means. In this case, the location detection means may be provided outside the drive recorder 512. Further, the vehicle location may be entered into the CPU 530 through manual operation by the user, without the use of the GPS receiver 523 and GPS antenna 522. In this case, a switch is provided externally to the drive recorder 512 so that the vehicle location can be entered by the user operating the switch and thereby sending a signal indicating eastern Japan or western Japan to the CPU 530. Furthermore, the first RAM 519 or the second RAM 520, or the combination thereof, may be made to correspond to the recording means. In this case, each RAM may be provided outside the drive recorder 512.

Next, a description will be given, by way of example, of how the effects of the LED traffic light flashing can be avoided by capturing video using the NTSC scheme in eastern Japan and the PAL scheme in western Japan. When video is captured using the NTSC video processing scheme in eastern Japan, from the earlier given equation (1) the flashing frequency fb of the LED traffic light in the captured video is calculated as 19.88 Hz (the cycle is about 0.05 seconds), and hence, the OFF period in the captured video, which is considered to be equal to one third of the flashing cycle, is about 0.02 seconds. Similarly, when video is captured using the PAL video processing scheme in western Japan, the flashing frequency fb is similarly calculated as 20.00 Hz, and the OFF period in the captured video is therefore about 0.02 seconds.

In this way, the OFF period in the captured video is about 0.02 seconds in both eastern Japan and western Japan. Therefore, the OFF period in the captured video is substantially shorter than the ON period of the yellow light whose ON period of about two seconds is the shortest among the three colors used in LED traffic lights. As a result, the illumination state of the yellow light can be checked without being affected by the LED traffic light flashing. Furthermore, since the NTSC and PAL video processing schemes are used, there is no need to provide an additional display monitor at the time of the installation of the camera, and the captured video can be checked on the onboard monitor that displays the video signal using the commonly used standard video standard. Any other video processing scheme may be employed as long as the video processing scheme can hold the OFF period in the captured video shorter than the yellow light ON period of the LED traffic lights used in the region where the vehicle is located.

Figure 22:
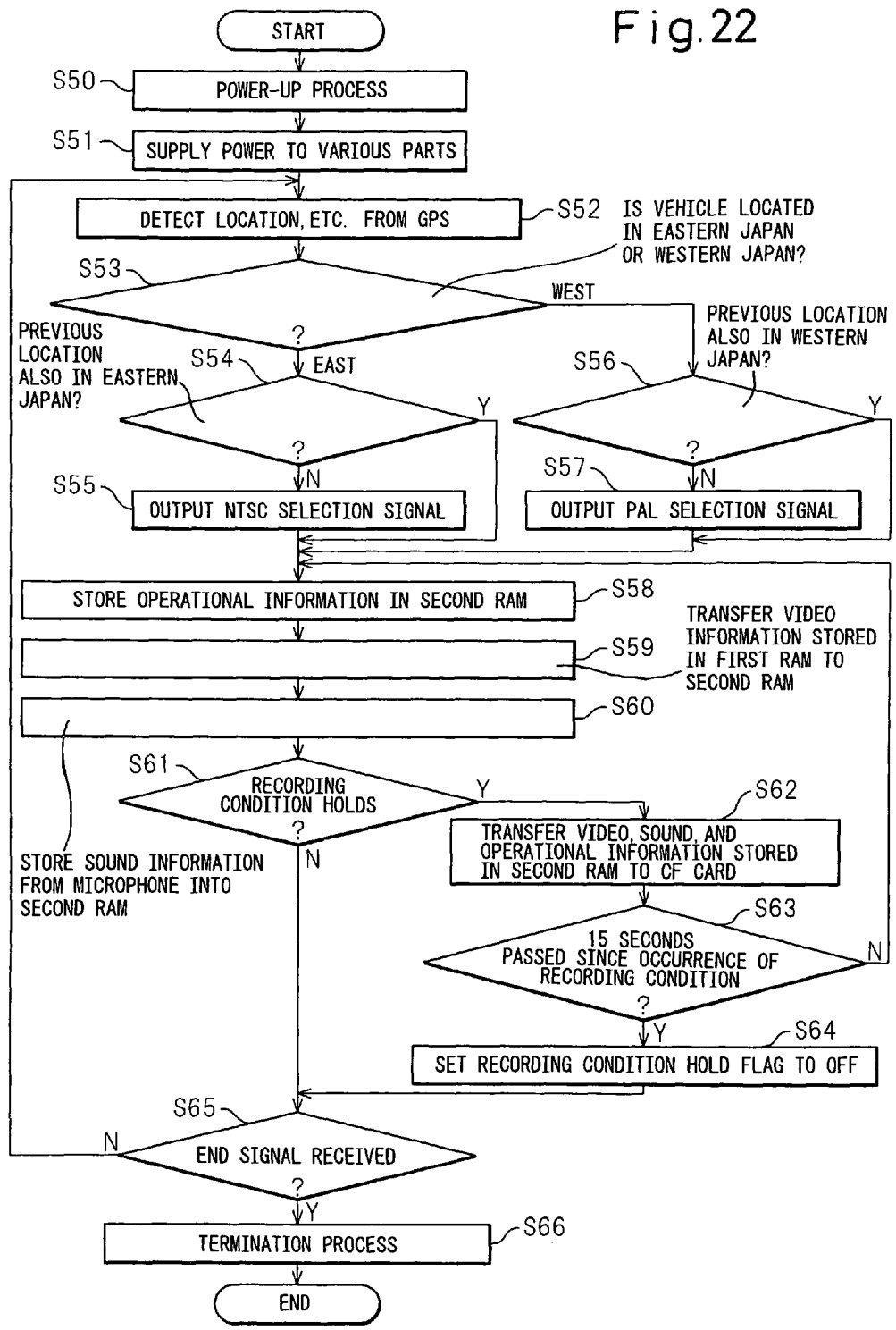
FIG. 22 is a flowchart illustrating the operation of a CPU 530.

FIG. 22 is a flow diagram illustrating one example of the operation of the CPU 530.

When the ON signal is received from the ACC switch 525 or the power SW 526, the power supply unit 527 supplies the power from the battery 524 to the CPU 530. When the power is supplied, the CPU 530 initiates the power-up process (S50). In the power-up process, the control program stored in the flash ROM 521 is read out and executed to set up the CPU 530 ready to perform arithmetic and logic operations. Further, control data are read out of the flash ROM 521 and loaded as initial values into the second RAM 520. At this time, the map information that can be used to discriminate between eastern Japan and western Japan is also loaded.

When the power-up process is completed, power is supplied to the various parts of the drive recorder 512, such as the JPEG-IC 518, the G sensor 514, etc. connected to the CPU 530 (S51).

Next, the location of the vehicle 1 and the time and date are detected via the GPS antenna 522 and the GPS receiver 423 (S52).

Next, based on the earlier loaded map information that can be used to discriminate between eastern Japan and western Japan, i.e., based on the latitude/longitude information and the location of the vehicle, it is determined whether the vehicle is located in eastern Japan or western Japan (S53). The steps S52 and S53 together correspond to the step of detecting the location of the vehicle.

If it is determined that the vehicle is located in eastern Japan, the process proceeds to S54. In S54, it is determined whether the previous location was also in eastern Japan. The "previous location" means the location detected in the previous cycle of the processing routine being performed by the CPU 530; in the first cycle of the processing routine immediately after the completion of the power-up process, there is no previous data. In this case, the answer to S54 "Was the previous location also in eastern Japan?" is NO.

If the answer is NO in S54, i.e., if it is determined that the previous location was not in eastern Japan (but in western Japan), this means that the determination has been made either for the first time after the CPU 530 was powered up in eastern Japan or immediately after the vehicle moved from western Japan into eastern Japan. Accordingly, the scheme selection signal for selecting the NTSC scheme is sent to the camera 513 and the JPEG-IC 518 in order to shorten the OFF period of the LED traffic light in the video captured in eastern Japan (S55). When the scheme selection signal is received from the CPU 530, the camera 513 and the JPEG-IC 518 thereafter perform control based on the NTSC scheme.

If it is determined in S54 that the previous location was also in eastern Japan, the process jumps to S58. That is, when it is determined that the previous location was also in eastern Japan, this means that the NTSC scheme is already selected as the video processing scheme for the camera 513 and the JPEG-IC 518, so that there is no need to select the same scheme once again in the current cycle of the processing routine.

On the other hand, if it is determined in S53 that the vehicle is located in western Japan, the process proceeds to S56. In S56, it is determined whether the previous location was also in western Japan.

If the answer is NO in S56, i.e., if it is determined that the previous location was not in western Japan (but in eastern Japan), this means that the determination has been made either for the first time after the CPU 530 was powered up in western Japan or immediately after the vehicle moved from eastern Japan into western Japan; accordingly, the scheme selection signal for selecting the PAL scheme is sent to the camera 513 and the JPEG-IC 518 in order to shorten the OFF period of the LED traffic light in the video captured in western Japan (S57). When the scheme selection signal is received from the CPU 530, the camera 513 and the JPEG-IC 518 thereafter perform control based on the PAL scheme.

If it is determined in S56 that the previous location was also in western Japan, the process jumps to S58. That is, when it is determined that the previous location was also in western Japan, this means that the PAL scheme is already selected as the video processing scheme for the camera 513 and the JPEG-IC 518, so that there is no need to select the same scheme once again in the current cycle of the processing routine.

The steps from S53 to S57 together correspond to the step of selecting the video processing scheme.

In S58, the vehicle operational information, which includes the location of the vehicle 1, time and date, vehicle speed, and gravitational acceleration, is stored in the second RAM 520.

In S59, the video information converted by the JPEG-IC 518 into the JPEG file format is stored in the second RAM 520 by being associated with the vehicle operational information stored in S58.

In S60, the sound information from the microphone 528 is stored in the second RAM 520 by being associated with the vehicle operational information stored in S58.

In S61, it is determined whether the recording condition holds or not. The recording condition holds when an impact or the like comparable to a collision is applied to the vehicle 1 and when the CPU 530 determines, based on the gravitational acceleration detected by the G sensor 514, that a collision has occurred. The condition also when the capture SW 529 is operated. If it is determined that the recording condition holds, the process proceeds to S62. When the recording condition holds, the CPU 530 sets a recording condition hold flag to ON. Once the flag is ON, it is determined that the condition always holds in S61 until the flag is set to OFF in a subsequent step S64, and the process proceeds to S62.

In S62, the video and sound information and the vehicle operational information consisting of the location of the vehicle 1, time and date, vehicle speed, and gravitational acceleration, stored in the second RAM 520, are recorded on the CF card 515. When carrying out the control operation of S62 for the first time in the illustrated flow, the various kinds of information recorded in the second RAM 520 for 15 seconds before the occurrence of the recording condition are transferred for recording on the CF card 515. In the second and subsequent cycles, the various kinds of information stored in the preceding steps S58, S59, and S60 are transferred for recording on the CF card 515. S62 corresponds to the step of recording the video information. Alternatively, S59 may be made to correspond to the step of recording the video information, or S59 and S62 together may be made to correspond to the step of recording the video information.

In S63, it is determined whether 15 seconds have passed since the occurrence of the recording condition. If it is determined that 15 seconds have not yet passed, the process returns to S58 to repeat the steps of storing the various kinds of information in the second RAM 520 and recording the stored information onto the CF card 515. In this way, the various kinds of information recorded for 15 seconds before and after the occurrence of the recording condition, i.e., a total of 30 seconds, are transferred to the CF card 515 for recording. On the other hand, if it is determined that 15 seconds have passed, the process proceeds to S64.

In S64, the recording condition hold flag that was set to ON in S61 is set to OFF. As a result, unless a new recording condition occurs, the answer in S61 in the next cycle is NO, and the control operation for recording the image information, etc., on the CF card 515 is not performed.

On the other hand, if it is determined in S61 that the recording condition does not hold, the video information, etc., are not transferred for recording on the CF card 515, and the process proceeds to S65.

In S65, it is determined whether the end signal is received from the power supply unit 527. If it is determined that the end signal is received, the process proceeds to S66. If it is determined that the end signal is not received yet, the process returns to S52 to acquire the location information of the vehicle 1 once again, and the above-described process is repeated. That is, while the ACC switch 525 is on, the vehicle may be moving and may move across the boundary from eastern Japan to western Japan or vice versa. Accordingly, while the ACC switch 525 is on, the location information needs to be acquired at predetermined intervals of time and, if it is determined that the boundary is crossed, the scheme selection information must be transmitted so that the appropriate video processing scheme can be selected.

In S66, the CPU 530 performs the termination process. That is, the OFF signal is sent to the power supply unit 527 to stop the supply of power from the power supply unit 527. Upon completion of the termination process, the flowchart ends.

Figure 23:
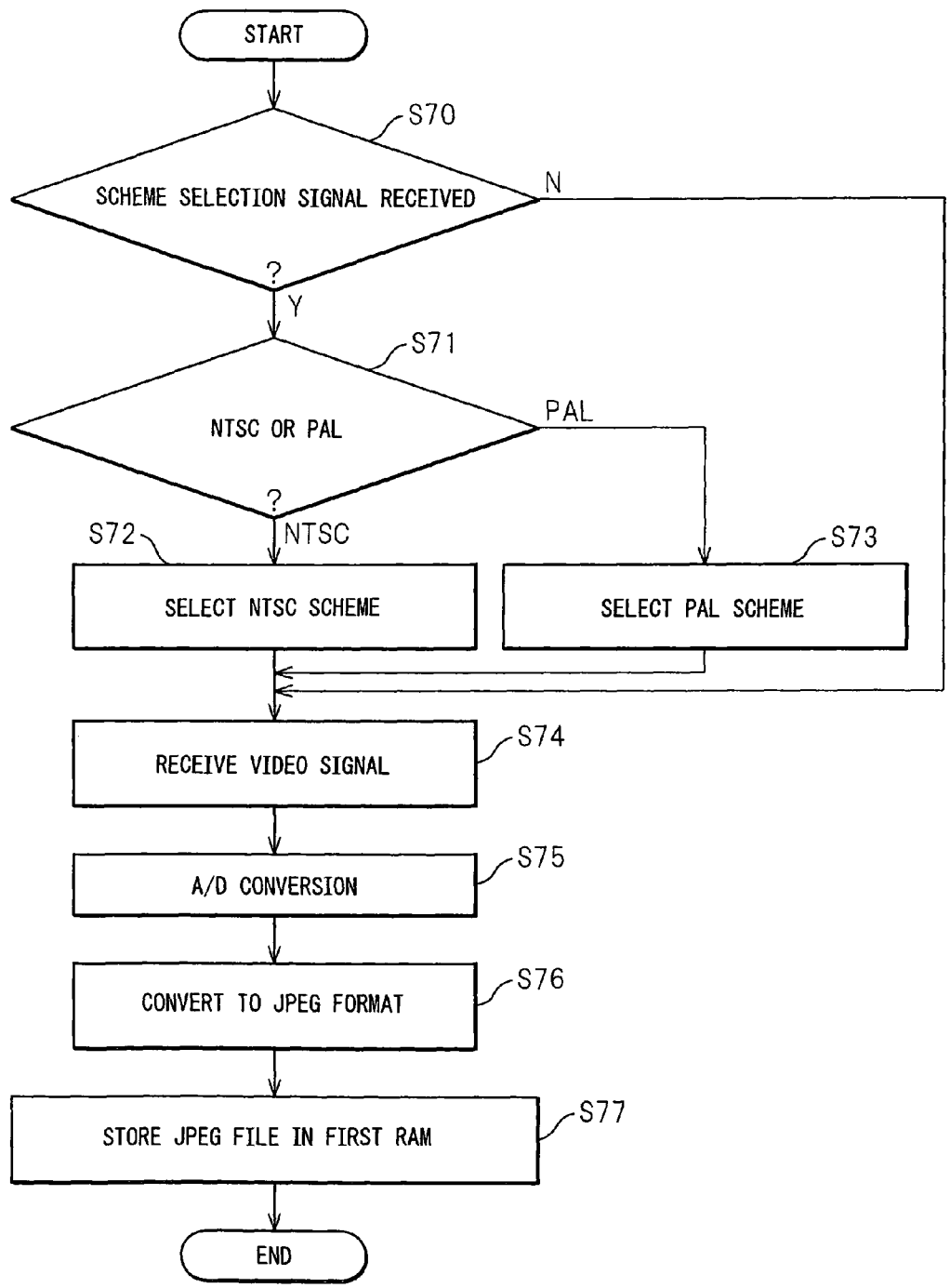
FIG. 23 is a flowchart illustrating the operation of a JPEG-IC 518.

FIG. 23 is a flow diagram illustrating one example of the control operation of the JPEG-IC 518.

The JPEG-IC 518 starts the control operation when power is supplied from the power supply unit 527. When the control operation starts, it is determined whether the scheme selection signal for selecting the video processing scheme is received from the CPU 530 (S70). If the selection signal is received, the process proceeds to S71. If it is determined that the selection signal is not received, the subsequent control is not performed, and the process proceeds directly to S74.

In S71, it is determined whether the scheme selection signal received from the CPU 530 indicates the NTSC scheme or the PAL scheme. If the selection signal indicates the NTSC scheme, the process proceeds to S72, but if the selection signal indicates the PAL scheme, the process proceeds to S73.

In S72, the JPEG-IC 518 selects and sets up the NTSC scheme as the video data processing scheme.

Next, the video signal captured by the camera 512 is received in the form of a video signal (S74). When the video signal is received, A/D conversion is performed (S75), and the video signal is converted into the JPEG format (S76).

In S77, the data converted into the JPEG format is stored in the first RAM 519. When the data is stored, the control process is terminated.

Figure 24:
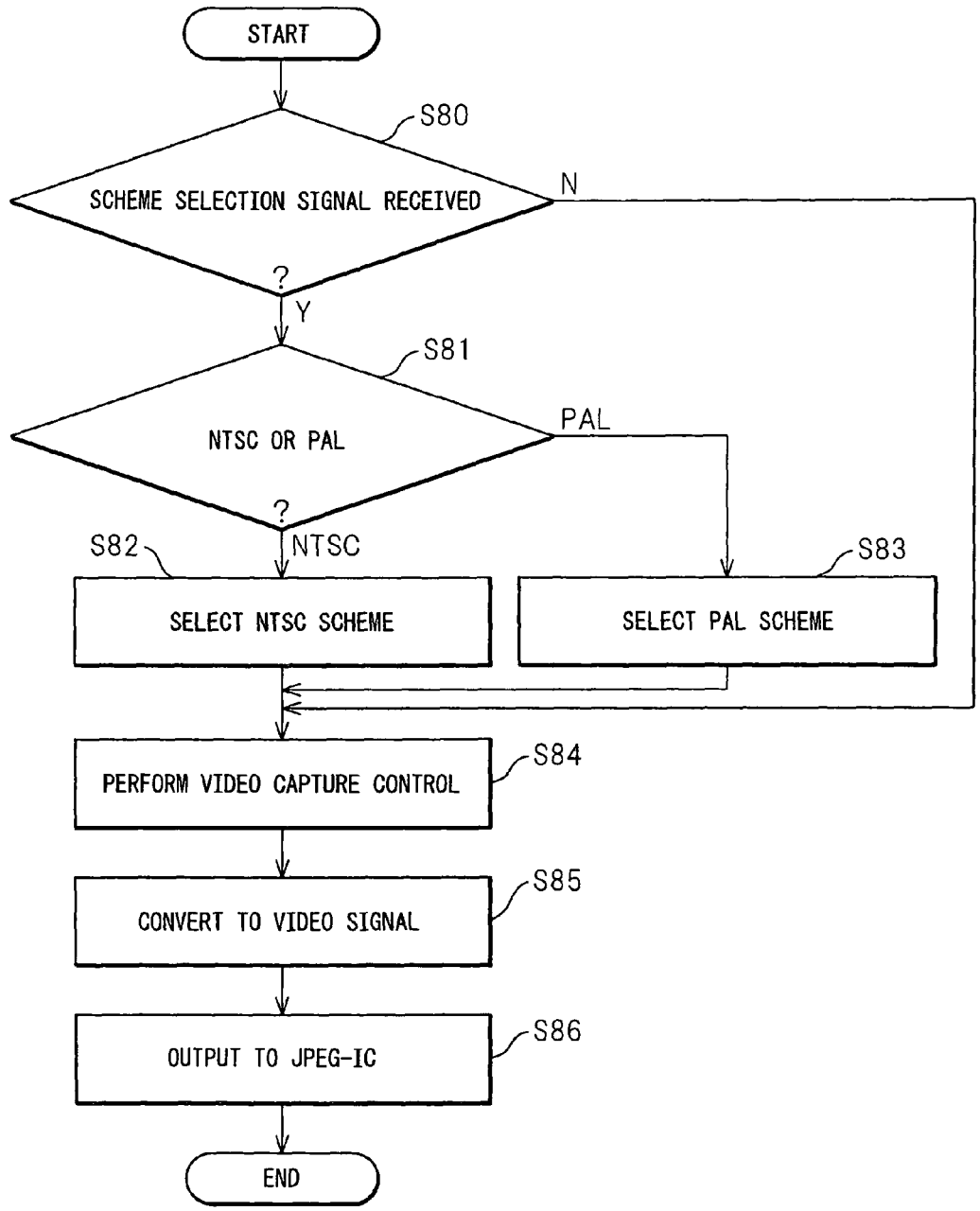
FIG. 24 is a flowchart illustrating the operation of a camera 513.

FIG. 24 is a flow diagram illustrating one example of the control operation of the camera 513.

The camera 513 starts the control operation when power is supplied from the power supply unit 527. When the control operation starts, it is determined whether the scheme selection signal for selecting the video processing scheme is received from the CPU 530 (S80). If the selection signal is received, the process proceeds to S81. If it is determined that the selection signal is not received, the subsequent control is not performed, and the process proceeds directly to S84.

In S81, it is determined whether the scheme selection signal received from the CPU 530 indicates the NTSC scheme or the PAL scheme. If the selection signal indicates the NTSC scheme, the process proceeds to S82, but if the selection signal indicates the PAL scheme, the process proceeds to S83.

In S82, the camera 513 selects and sets up the NTSC scheme as the video capture control and video signal generation scheme. On the other hand, in S83, the PAL scheme is selected for video capture control, etc.

After selecting the video processing scheme, that is, after S82 or S83, the camera 513 may transmit a signal indicating the selected video processing scheme to the JPEG-IC 518. In this case, when the signal is received, the JPEG-IC 518 selects and sets up the corresponding processing scheme so that the conversion to the JPEG file can be performed in a manner synchronized to the NTSC or PAL video signal received from the camera 513. This serves to eliminate the need to receive the scheme selection signal directly from the CPU 530.

In S84, the video capture control is performed in accordance with the scheme selected in S82 or S83, and the captured video is converted to the video signal (S85). Then, the video signal is passed to the JPEG-IC 518 (S86), and the control process is terminated.

In the system comprising the drive recorder described above, the NTSC standard and PAL standard are used as the standardized video processing schemes, but instead of the PAL standard, the SECAM (Sequentiel Couleur A Memoire) standard may be used. The SECAM standard is the video processing scheme primarily used in France, and differs from the PAL standard in that the vertical synchronization frequency is 50 Hz. Further, instead of these standards, other video processing schemes that are not affected by the LED traffic light flashing may be used. That is, use can be made of any video processing scheme as long as the video capture timing is set so that the video capture cycle does not become synchronized to the LED traffic light flashing cycle and so that the period throughout which the LED traffic lights appear to remain off when the captured video is displayed on the reproduction apparatus is shorter than the ON period of any light in the traffic lights. The period shorter than the ON period of any light in the traffic lights generally refers to the period shorter than the ON period of the yellow light whose ON period is the shortest.

The system comprising the drive recorder described above can record images by using the standardized video processing scheme that matches the location of the vehicle 1. Accordingly, the images can be recorded without causing the video recording cycle to become synchronized to the OFF cycle of the LED traffic lights installed in the region where the vehicle 1 is located, and thus the OFF period of the LED traffic lights in the captured video can be shortened. This serves to enhance reliability when investigating an accident, etc., using the captured video.

Furthermore, since the system comprising the drive recorder described above uses the traditionally used video processing standards, there is no need to install an additional display monitor at the time of the installation of the camera, and the captured video can be checked on the onboard monitor that displays the video signal using the commonly used video standard.

The invention claimed is:

1. A drive recorder comprising:
    an image convening unit for converting a received video signal into image information, and for outputting said image information in the form of a video signal;
    a storage unit for storing said converted image information; and
    a control unit for performing control so that said received video signal is converted into said image information by using a first frequency not affected by flashing of a LED traffic light, and so that said image information stored in said storage unit is output in the form of a video signal by using a second frequency corresponding to a standard video signal, wherein said first frequency is determined in such a way that one third of a flashing cycle of the LED traffic light in a captured video is shorter than an ON period of the LED traffic light.

2. The drive recorder according to claim 1, further comprising a frequency switching unit for switching between said first frequency and said second frequency, and wherein
    said control unit controls said image converting unit and said frequency switching unit so that said video signal is converted into said image information by using said first frequency, and so that said image information stored in said storage unit is output in the form of a video signal by using said second frequency.

3. The drive recorder according to claim 1, further comprising a frequency switching unit for switching among said first frequency and a plurality of said second frequencies, and wherein
    said control unit controls said image converting unit and said frequency switching unit so that said video signal is converted into said image information by using said first frequency, and so that said image information stored in said storage unit is output in the form of a video signal by using a selected one of said plurality of second frequencies.

4. The drive recorder according to claim 1, wherein said image converting unit includes a first converting unit for converting said received video signal into said image information by using said first frequency and a second converting unit for outputting said image information in the form of a video signal by using said second frequency, and
    said control unit controls said first and second image converting units so that said video signal is converted into said image information, and so that said image information stored in said storage unit is output in the form of a video signal.

5. The drive recorder according to claim 1, further comprising an operation unit for setting a timing with which said image information stored in said storage unit is output in the form of a video signal by using said second frequency.

6. The drive recorder according to claim 1, wherein said storage unit is a buffer memory for temporary storage or a portable recording medium.

7. A drive recorder comprising:
    a storage unit for storing an image signal created based on a first video signal that is input as a video signal corresponding to a frequency not affected by flashing of a LED traffic light; and
    a video signal switching unit for directing said first video signal to said storage unit, and for directing to a display a second video signal that is input as a video signal corresponding to a standard frequency for display, wherein said first frequency is determined in such a way that one third of a flashing cycle of the LED traffic light in a captured video is shorter than an ON period of the LED traffic light.

8. The drive recorder according to claim 7, further comprising a frequency switching unit for switching between a first frequency not affected by LED traffic light flashing and a second frequency corresponding to said standard frequency, and wherein
    said video signal switching unit converts said first video signal into said image signal by using said first frequency, and outputs said second video signal by using said second frequency.

9. A drive recording system comprising:
    an image capturing unit for outputting a first video signal corresponding to a frequency not affected by flashing of a LED traffic light and a second video signal corresponding to a standard frequency;
    a drive recording for converting said first video signal input thereto into image information, and for storing said image information;
    a display unit for displaying said second video signal; and
    a video signal switching unit for directing said first video signal from said image capturing unit to said drive recorder, and for directing said second video signal from said image capturing unit to said display unit, wherein said first frequency is determined in such a way that one third of a flashing cycle of the LED traffic light in a captured video is shorter than an ON period of the LED traffic light.

10. The drive recording system according to claim 9, wherein said drive recorder includes
    an image converting unit for converting said first video signal input thereto into image information, and for outputting said image information in the form of said second video signal,
    a storage unit for storing said converted image information,
    a frequency switching unit for switching between said frequency not affected by said LED traffic light flashing and said standard frequency, and
    a control unit for controlling said image converting unit and said frequency switching unit so that said first video signal is converted into said image information by using said frequency not affected by said LED traffic light flashing, and so that said image information stored in said storage unit is output in the form of said second video signal by using said standard frequency.

11. The drive recording system according to claim 9, wherein said drive recorder includes
- an image converting unit for converting said first video signal input thereto into image information, and for outputting said image information in the form of said second video signal,
- a storage unit for storing said converted image information,
- a frequency switching unit for switching among said frequency not affected by said LED traffic light flashing and a plurality of standard frequencies corresponding to a plurality of standard video signals, and
- a control unit for controlling said image converting unit and said frequency switching unit so that said first video signal is converted into said image information by using said frequency not affected by said LED traffic light flashing, and so that said image information stored in said storage unit is output in the form of said second video signal by using a selected one of said plurality of standard frequencies.

12. The drive recording system according to claim 9, wherein said drive recorder includes
- a first image converting unit for converting said first video signal input thereto into image information,
- a storage unit for storing said converted image information,
- a second image converting unit for outputting said stored image information in the form of said second video signal, and
- a control unit for controlling said first and second image converting units so that said first video signal is converted into said image information, and so that said image information stored in said storage unit is output in the form of said second video signal.

13. The drive recording system according to claim 9, wherein said storage unit is a buffer memory for temporary storage or a portable recording medium.

14. The drive recording system according to claim 9, wherein said image capturing unit includes an image signal setting unit for making a setting as to which of said first and second video signals is to be output.

15. The drive recording system according to claim 14, wherein said drive recorder includes an operation unit for switching between said first and second video signals to be output from said image capturing unit.

16. The drive recording system according to claim 15, wherein said control unit controls said video signal switching unit and said image signal setting unit in accordance with the switching operation of said operation unit so that said first video signal output from said image capturing unit is directed to said drive recorder, and so that said second video signal output from said image capturing unit is directed to said display unit.

* * * * *

UNITED STATES PATENT AND TRADEMARK OFFICE
CERTIFICATE OF CORRECTION

| | | |
|---|---|---|
| PATENT NO. | : 9,019,377 B2 | Page 1 of 1 |
| APPLICATION NO. | : 12/448186 | |
| DATED | : April 28, 2015 | |
| INVENTOR(S) | : Munenori Maeda et al. | |

It is certified that error appears in the above-identified patent and that said Letters Patent is hereby corrected as shown below:

On the Title Page

(75) Inventors:  Delete "Munenori Maeda, Kobe (JP); Fujio Tonokawa, Kobe (JP); Katsutoshi Okada, Kobe (JP); Takashi Sasa, Kochi (JP)",
Insert --Munenori Maeda, Kobe-shi (JP); Fujio Tonokawa, Kobe-shi (JP); Katsutoshi Okada, Kobe-shi (JP); Takashi Sasa, Kochi-shi (JP)--

(56) References Cited, Foreign Patent Documents  Delete "JP   63-016785   1/1888",
Insert --JP   63-016785   1/1988--

In the Claims

Col. 33, line 25, Claim 1  Delete "image convening",
Insert --image converting--

Signed and Sealed this
Twenty-fourth Day of May, 2016

Michelle K. Lee
*Director of the United States Patent and Trademark Office*